US012501289B2

United States Patent
Peng et al.

(10) Patent No.: US 12,501,289 B2
(45) Date of Patent: Dec. 16, 2025

(54) FAULT PROCESSING METHOD, CONTROL PLANE NETWORK ELEMENT, STEERING DECISION-MAKING NETWORK ELEMENT, AND RELATED DEVICE

(71) Applicant: Huawei Technologies Co., Ltd., Shenzhen (CN)

(72) Inventors: Tao Peng, Nanjing (CN); Zhouyi Yu, Beijing (CN); Rongrong Hua, Nanjing (CN); Xiaokai Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 319 days.

(21) Appl. No.: 18/344,014

(22) Filed: Jun. 29, 2023

(65) Prior Publication Data

US 2023/0345273 A1 Oct. 26, 2023

Related U.S. Application Data

(63) Continuation of application No. PCT/CN2021/142712, filed on Dec. 29, 2021.

(30) Foreign Application Priority Data

Dec. 30, 2020 (CN) .......................... 202011614473.2

(51) Int. Cl.
*H04W 24/04* (2009.01)
*H04L 41/0663* (2022.01)
(Continued)

(52) U.S. Cl.
CPC ......... *H04W 24/04* (2013.01); *H04L 41/0663* (2013.01); *H04L 41/40* (2022.05);
(Continued)

(58) Field of Classification Search
CPC ..... H04L 41/00; H04L 41/12; H04L 41/0654; H04L 41/0663; H04L 41/40;
(Continued)

(56) References Cited

U.S. PATENT DOCUMENTS 10,785,652 B1 * 9/2020 Ravindranath ....... H04W 12/48
10,951,478 B2 * 3/2021 Ghadge ................. H04W 12/04
(Continued)

FOREIGN PATENT DOCUMENTS

CN 107135116 A 9/2017
CN 109428780 A 3/2019
(Continued)

OTHER PUBLICATIONS

"TR-459, Control and User Plane Separation for a Disaggregated BNG," Issue 1, Broadband Forum, Technical Report, Final Ballot, XP051882750, Issue Date: Apr. 2020, 103 pages.

*Primary Examiner* — Pao Sinkantarakorn
*Assistant Examiner* — Pawaris Sinkantarakorn
(74) *Attorney, Agent, or Firm* — Slater Matsil, LLP

(57) ABSTRACT

In a process in which a terminal device accesses a network, if a control plane network element determines that a fault occurs on a steering decision-making network element, to ensure that the terminal device can continue to access the network, the control plane network element may directly control, without decision of the steering decision-making unit, the terminal device to send a data packet through a first user plane network element for a dial-up request.

20 Claims, 10 Drawing Sheets

(51) Int. Cl.
*H04L 41/40* (2022.01)
*H04L 47/2425* (2022.01)
*H04W 28/02* (2009.01)
*H04W 28/084* (2023.01)
*H04W 28/088* (2023.01)

(52) U.S. Cl.
CPC ..... *H04L 47/2425* (2013.01); *H04W 28/0247* (2013.01); *H04W 28/084* (2023.05); *H04W 28/088* (2023.05)

(58) Field of Classification Search
CPC .............. H04L 47/2425; H04W 24/04; H04W 28/0247; H04W 28/084; H04W 28/088
See application file for complete search history.

(56) References Cited

U.S. PATENT DOCUMENTS

| | | |
|---|---|---|
| 11,457,489 B2 | 9/2022 | Hu et al. |
| 2016/0381596 A1 | 12/2016 | Hu et al. |
| 2018/0367427 A1 | 12/2018 | Zheng |
| 2021/0194788 A1* | 6/2021 | Liu ......................... H04L 12/28 |
| 2021/0195689 A1* | 6/2021 | Pocha ................... H04W 12/06 |
| 2022/0061129 A1* | 2/2022 | Pani ....................... H04L 12/66 |

FOREIGN PATENT DOCUMENTS

| | | |
|---|---|---|
| CN | 109429221 A | 3/2019 |
| EP | 4221117 A1 | 8/2023 |

\* cited by examiner

FAULT PROCESSING METHOD, CONTROL PLANE NETWORK ELEMENT, STEERING DECISION-MAKING NETWORK ELEMENT, AND RELATED DEVICE

CROSS-REFERENCE TO RELATED APPLICATIONS

This application is a continuation of International Application No. PCT/CN2021/142712, filed on Dec. 29, 2021, which claims priority to Chinese Patent Application No. 202011614473.2 filed on Dec. 30, 2020. The disclosures of the aforementioned applications are hereby incorporated by reference in their entireties.

TECHNICAL FIELD

This application relates to the field of broadband network technologies, and in particular, to a fault processing method, a control plane network element, a steering decision-making network element, and a related device.

BACKGROUND

A broadband network gateway (BNG) is a bridge for a terminal device to access a broadband network. The BNG is mainly configured to: manage a session initiated by the terminal device, forward traffic of the terminal device, and so on. With development of a software-defined networking (SDN) technology and a network functions virtualization (NFV) technology, a forwarding function and a control function of the BNG need to be decoupled, to improve performance of the BNG. The BNG whose forwarding function and control function are decoupled includes one control plane (CP) network element and a plurality of user plane network elements. The control plane network element is configured to manage the plurality of user plane network elements, and any user plane network element is configured to forward the traffic of the terminal device. In this scenario, a steering function (SF) network element further needs to be deployed between the terminal device and the plurality of user plane network elements. The SF network element is configured to steer, to a specific user plane network element according to a dynamic migration policy formulated by a user steering function (USF) network element, the traffic sent by the terminal device. In a process of sending the traffic by the terminal device, if a fault occurs on the SF network element or the USF network element, the terminal device cannot access the broadband network successfully. Therefore, how to process the fault that occurs on the SF network element and the USF network element is a problem that needs to be urgently resolved currently.

SUMMARY

This application provides a fault processing method, a control plane network element, a steering decision-making network element, and a related device, to avoid a case in which a terminal device cannot access a network or goes offline if a fault occurs on a network element in a process in which the terminal device communicates through a BNG. Technical solutions are as follows:

According to a first aspect, a fault processing method is provided. The method is performed by a control plane network element included in a broadband network gateway BNG on a network, the BNG further includes a plurality of user plane network elements, the network further includes a steering decision-making network element and a terminal device, and the steering decision-making network element is configured to steer traffic of the terminal device to one of the plurality of user plane network elements. In the method, the control plane network element receives a dial-up request from the terminal device, where the terminal device sends the dial-up request to the control plane network element through a first user plane network element, and the first user plane network element is one of the plurality of user plane network elements. When determining that a fault occurs on the steering decision-making network element, the control plane network element controls the terminal device to send a data packet through the first user plane network element.

In this application, in a process in which the terminal device accesses the network, if the control plane network element determines that the fault occurs on the steering decision-making network element, to ensure that the terminal device can continue to access the network, the control plane network element may directly control, without decision of the steering decision-making unit, the terminal device to send the data packet through the first user plane network element for the dial-up request. In other words, this application provides a manner in which the terminal device can continue to access the network when the fault occurs on the steering decision-making network element. To be specific, according to this application, a best-effort path in a single-network-element fault scenario can be implemented, so that the terminal device can still normally dial up.

According to the method provided in the first aspect, in a possible implementation, an implementation process of controlling the terminal device to send the data packet through the first user plane network element may be as follows: The control plane network element sends a user entry to the first user plane network element, where the user entry carries user information of the terminal device, and the first user plane network element forwards the data packet from the terminal device based on the user entry.

Because the fault has occurred on the steering decision-making network, the control plane network element may directly perform related configuration on the first user plane network element without decision of the steering decision-making unit, so that the terminal device can continue to access the network when the fault occurs on the steering decision-making network element.

According to the method provided in the first aspect, in a possible implementation, the steering decision-making network element includes any one or more of a steering function SF network element, a user steering function USF network element, and a software-defined networking SDN control network element. In this scenario, the fault of the steering decision-making network element includes at least one of the following cases:

After sending a fault detection request to the USF network element, the control plane network element does not receive, within first reference duration, a detection result message returned by the USF network element; or after sending a fault detection request to the USF network element, the control plane network element receives a detection result message returned by the USF network element, where the detection result message indicates that a fault occurs on the USF network element, the SF network element, or the SDN control network element.

Alternatively, after sending a fault detection request to the SDN control network element, the control plane network element does not receive, within second reference duration, a detection result message returned by the SDN control network element; or after sending a fault detection request to the SDN control network element, the control plane network element receives a detection result message returned by the SDN control network element, where the detection result message indicates that a fault occurs on the SF network element or the SDN control network element.

Alternatively, after sending a user migration policy request to the USF network element based on the dial-up request, the control plane network element does not receive, within third reference duration, a user migration result returned by the USF network element, or receives a detection result message returned by the USF network element, where the detection result message indicates that a fault occurs on the USF network element, the SF network element, or the SDN control network element.

In this application, after receiving the dial-up request of the terminal device, the control plane network element may actively detect whether the fault occurs on the steering decision-making unit; or may directly send the user migration policy request to the USF network element, and determine, based on a response status of the USF network element to the user migration policy request, whether the fault occurs on the steering decision-making unit. This improves flexibility of detecting, by the control plane network element, whether the fault occurs on the steering decision-making network element.

According to the method provided in the first aspect, in a possible implementation, after the controlling the terminal device to send a data packet through the first user plane network element, in the method, the control plane network element may further receive a user migration result sent by the steering decision-making network element after the fault is eliminated, where the user migration result carries an identifier of a second user plane network element, and the second user plane network element is a user plane network element other than the first user plane network element. The control plane network element sends the user entry to the second user plane network element, where the user entry carries the user information of the terminal device, and the second user plane network element forwards the data packet from the terminal device based on the user entry. After receiving an entry configuration success message returned by the second user plane network element, the control plane network element sends the entry configuration success message to the steering decision-making network element, to enable the steering decision-making network element to establish a mapping relationship between the terminal device and the second user plane network element, and forward the data packet of the terminal device to the second user plane network element based on the mapping relationship between the terminal device and the second user plane network element.

When the fault occurs on the steering decision-making network element, the control plane network element controls the terminal device to send the data packet through an initial user plane network element. This ensures that the terminal device continues to access the network when the fault occurs on the steering decision-making network element. However, if a data packet is forwarded always in this manner subsequently, scheduling between the user plane network elements on the network cannot be implemented, and load imbalance between the user plane network elements easily occurs. Therefore, after the fault occurs on the steering decision-making network element, once the control plane network element detects that the fault of the steering decision-making network element is eliminated, the control plane network element triggers the steering decision-making network element to perform user migration on the terminal device, to implement appropriate scheduling between the user plane network elements.

According to the method provided in the first aspect, in a possible implementation, when the terminal device sends the dial-up request for the first time, the first user plane network element is a preconfigured user plane network element; or when the terminal device sends the dial-up request not for the first time, the first user plane network element is a user plane network element for sending a data packet before the terminal device goes offline last time.

The foregoing manner of determining the first user plane network element can improve a success rate of accessing the network by the terminal when the fault occurs on the steering decision-making network element.

According to a second aspect, a fault processing method is provided. The method is performed by a control plane network element included in a broadband network gateway BNG on a network, the BNG further includes a plurality of user plane network elements, the network further includes a steering decision-making network element and a terminal device, and the steering decision-making network element is configured to steer traffic of the terminal device to one of the plurality of user plane network elements. In the method, the control plane network element receives a first migration configuration instruction sent by the steering decision-making unit, where the first migration configuration instruction carries an identifier of a first user plane network element and an identifier of the terminal device, and the first migration configuration instruction instructs to forward a data packet of the terminal device through the first user plane network element. After the control plane network element successfully sends a user entry to the first user plane network element based on the identifier of the first user plane network element, if the control plane network element determines that a fault occurs on the steering decision-making network element, the control plane network element sends a user entry rollback instruction to the first user plane network element, where the user entry rollback instruction instructs the first user plane network element to delete the added user entry. The user entry carries user information of the terminal device, and the first user plane network element forwards the data packet of the terminal device based on the user entry.

In this application, through the foregoing fault processing procedure, in a migration process of the terminal device, if the fault occurs on the steering decision-making network element (for example, the fault occurs on one or more of a USF network element, an SDN control network element, or an SF network element), message exchange between the control plane network element and the steering decision-making network fails. In this case, the control plane network element supports rollback of the delivered user entry, to avoid that the terminal device goes offline.

According to the method provided in the second aspect, in a possible implementation, the steering decision-making network element includes any one or more of the steering function SF network element, the user steering function USF network element, and the software-defined networking SDN control network element. In this scenario, the fault of the steering decision-making network element includes at least one of the following cases:

After sending a fault detection request to the USF network element, the control plane network element does not receive, within first reference duration, a detection result message returned by the USF network element; or after sending a fault detection request to the USF network element, the control plane network element receives a detection result message returned by the USF network element, where the detection result message indicates that a fault occurs on the USF network element, the SF network element, or the SDN control network element.

Alternatively, after sending a fault detection request to the SDN control network element, the control plane network element does not receive, within second reference duration, a detection result message returned by the SDN control network element; or after sending a fault detection request to the SDN control network element, the control plane network element receives a detection result message returned by the SDN control network element, where the detection result message indicates that a fault occurs on the SF network element or the SDN control network element.

Alternatively, after successfully sending the user entry to the first user plane network element based on the identifier of the first user plane network element, the control plane network element sends an entry configuration success message to the USF network element; and after sending the entry configuration success message to the USF, the control plane network element receives, within third reference duration, no message returned by the USF network element; or after sending the entry configuration success message to the USF, the control plane network element receives a migration failure message sent by the USF network element, where the migration failure message indicates that the fault occurs on the USF network element, the SDN control network element, or the SF network element.

In this application, the control plane network element may actively detect whether the fault occurs on the steering decision-making unit; or may directly send the entry configuration success message to the USF network element, and determine, based on a response status of the USF network element to the entry configuration success message, whether the fault occurs on the steering decision-making unit. This improves flexibility of detecting, by the control plane network element, whether the fault occurs on the steering decision-making network element.

According to the method provided in the second aspect, in a possible implementation, when the fault occurs on the SDN control network element or the SF network element, the USF network element is configured to control the SF network element to bind the terminal device to a user plane network element for sending a data packet last time, to enable the terminal device to continue to send the data packet through the user plane network element for sending the data packet last time.

After the USF network element notifies the SDN control network element to perform a steering operation, in a scenario in which the SF network element completes binding between the terminal device and the first user plane network element under a command of the SDN control network element but does not delete, due to the fault, a binding relationship between the terminal device and another user plane network element that is previously used, or the SF network element deletes a binding relationship between the terminal device and another user plane network element that is previously used but does not complete binding between the terminal device and the first user plane network element due to the fault, where the another user plane network element herein is a user plane network element for sending a data packet before the terminal device is migrated, after the USF network element receives the migration failure message returned by the SDN control network element, the USF network element is further configured to control the SF network element to bind the terminal device to the user plane network element for sending the data packet last time, so that the terminal device continues to send the data packet through the user plane network element for sending the data packet last time.

According to the method provided in the second aspect, in a possible implementation, before that the control plane network element receives a first migration configuration instruction sent by the steering decision-making unit, in the method, the control plane network element receives a user service level agreement SLA change message, where the user SLA change message indicates that user information of the terminal device is updated. The control plane network element forwards the user SLA change message to the steering decision-making network element, to enable the steering decision-making network element to configure the first user plane network element for the terminal device based on updated user information, and send the first migration configuration instruction to the control plane network element.

According to the method provided in the second aspect, in a possible implementation, after that the control plane network element receives a user SLA change message, in the method, the control plane network element remains in a current state when determining that the fault occurs on the steering decision-making network element.

After the control plane network element receives the user SLA change message, if the control plane has determined that the fault occurs on the steering decision-making network element, the control plane remains in the current state without performing any operation, to avoid meaningless user migration.

According to the method provided in the second aspect, in a possible implementation, the steering decision-making network element includes any one or more of the steering function SF network element, the user steering function USF network element, and the software-defined networking SDN control network element. In this scenario, the fault of the steering decision-making network element includes at least one of the following cases:

After sending a fault detection request to the USF network element, the control plane network element does not receive, within fifth reference duration, a detection result message returned by the USF network element; or after sending a fault detection request to the USF network element, the control plane network element receives a detection result message returned by the USF network element, where the detection result message indicates that a fault occurs on the USF network element, the SF network element, or the SDN control network element.

Alternatively, after sending a fault detection request to the SDN control network element, the control plane network element does not receive, within sixth reference duration, a detection result message returned by the SDN control network element; or after sending a fault detection request to the SDN control network element, the control plane network element receives a detection result message returned by the SDN control network element, where the detection result message indicates that a fault occurs on the SF network element or the SDN control network element.

Alternatively, after forwarding the user SLA change message to the USF network element, the control plane network element receives, within fourth reference duration, no message returned by the USF network element; or after forwarding the user SLA change message to the USF network element, the control plane network element receives a detection result message sent by the USF network element, where the detection result message indicates that the fault occurs on the USF network element, the SDN control network element, or the SF network element.

In this application, after receiving the user SLA change message, the control plane network element may actively detect whether the fault occurs on the steering decision-making unit; or may directly send the user SLA change message to the USF network element, and determine, based on a response status of the USF network element to the user SLA change message, whether the fault occurs on the steering decision-making unit. This improves flexibility of detecting, by the control plane network element, whether the fault occurs on the steering decision-making network element.

According to the method provided in the second aspect, in a possible implementation, in the method, when the control plane network element determines that the fault of the steering decision-making network element is eliminated, the control plane network element forwards a user SLA change message to the steering decision-making network element, where the user SLA change message indicates that the user information of the terminal device is updated, to enable the steering decision-making network element to configure a second user plane network element for the terminal device based on updated user information, and send, to the control plane network element, a second migration configuration instruction that carries an identifier of the second user plane network element.

Because a moment at which the fault is eliminated is not the same as a moment at which the fault occurs, regardless of which fault occurs, the control plane network element needs to re-trigger an entire user migration procedure. To be specific, the control plane network element needs to forward the user SLA change message to the steering decision-making network element, so that the USF network element in the steering decision-making network elements determines a latest user plane network element based on a current network status and the user SLA change message.

According to a third aspect, a fault processing method is provided. The method is performed by a steering decision-making network element on a network, the network further includes a broadband network gateway BNG and a terminal device, the BNG includes a control plane network element and a plurality of user plane network elements, and the steering decision-making network element is configured to steer traffic of the terminal device to one of the plurality of user plane network elements.

In the method, a migration configuration instruction is generated when it is determined that the traffic of the terminal device needs to be steered to a first user plane network element, where the migration configuration instruction carries an identifier of the first user plane network element and an identifier of the terminal device, and the migration configuration instruction instructs to forward a data packet of the terminal device through the first user plane network element. If the steering decision-making network element determines that a fault occurs on the steering decision-making network element, the steering decision-making network element skips sending the migration configuration instruction to the control plane network element. The steering decision-making network element resends the migration configuration instruction to the control plane network element when determining that the fault of the steering decision-making network element is eliminated.

In a scenario in which the steering decision-making network element actively triggers migration of the terminal device, if the steering decision-making network element can detect that the fault occurs on the steering decision-making network element, a subsequent operation of the migration is not triggered currently, but is re-triggered when the fault is eliminated, thereby avoiding unnecessary migration triggered in a scenario in which the fault occurs on the steering decision-making network element.

According to the method provided in the third aspect, in a possible implementation, the steering decision-making network element includes any one or more of a steering function SF network element, a user steering function USF network element, and a software-defined networking SDN control network element. In this scenario, the fault of the steering decision-making network element includes at least one of the following cases: The USF network element determines that the fault occurs on the USF network element. Alternatively, after sending a fault detection request to the SDN network element, the USF network element does not receive, within first reference duration, a detection result message returned by the SDN network element. Alternatively, after sending a fault detection request to the SDN network element, the USF network element receives a detection result message returned by the SDN network element, where the detection result message indicates that a fault occurs on the SF network element or the SDN control network element.

In this application, in addition to detecting whether the fault occurs on the USF network element, the USF network element may further determine, in an active detection manner, whether the fault occurs on the SDN control network element and the SF network element. This improves flexibility of the fault processing method provided in this application.

According to the method provided in the third aspect, in a possible implementation, in the method, when a selection operation for a migration control displayed on a display interface of the steering decision-making network element is detected, it is determined that the traffic of the terminal device needs to be steered to the first user plane network element, where both the terminal device and the first user plane network element are specified by a user by using the migration control. Alternatively, when it is detected that the first user plane network element other than the plurality of user plane network elements is added to the network, it is determined that the traffic of the terminal device needs to be steered to the first user plane network element.

The USF network element in this application actively triggers the migration of the terminal device in the foregoing two scenarios, to improve application flexibility of this application.

According to a fourth aspect, a control plane network element is provided. The control plane network element has a function of implementing behavior in the fault processing method in the first aspect. The control plane network element includes at least one module, and the at least one module is configured to implement the fault processing method according to the first aspect.

According to a fifth aspect, a control plane network element is provided. The control plane network element has a function of implementing behavior in the fault processing method in the second aspect. The control plane network element includes at least one module, and the at least one module is configured to implement the fault processing method according to the second aspect.

According to a sixth aspect, a steering decision-making network element is provided. The steering decision-making network element has a function of implementing behavior in the fault processing method in the third aspect. The steering decision-making network element includes at least one module, and the at least one module is configured to implement the fault processing method according to the third aspect.

According to a seventh aspect, a network device is provided. A structure of the network device includes a processor and a memory. The memory is configured to: store a program that supports the network device in performing the fault processing method according to the first aspect, the second aspect, or the third aspect, and store data for implementing the fault processing method according to the first aspect, the second aspect, or the third aspect. The processor is configured to execute the program stored in the memory. An operation apparatus of the storage device may further include a communication bus, and the communication bus is configured to establish a connection between the processor and the memory.

According to an eighth aspect, a computer-readable storage medium is provided. The computer-readable storage medium stores instructions; and when the instructions are run on a computer, the computer is enabled to perform the fault processing method according to the first aspect, the second aspect, or the third aspect.

According to a ninth aspect, a computer program product including instructions is provided. When the computer program product runs on a computer, the computer is enabled to perform the fault processing method according to the first aspect, the second aspect, or the third aspect.

Technical effects obtained in the fourth aspect to the ninth aspect are similar to the technical effects obtained through corresponding technical means in the first aspect, the second aspect, or the third aspect. Details are not described herein again.

DETAILED DESCRIPTION OF ILLUSTRATIVE EMBODIMENTS

Figure 1:
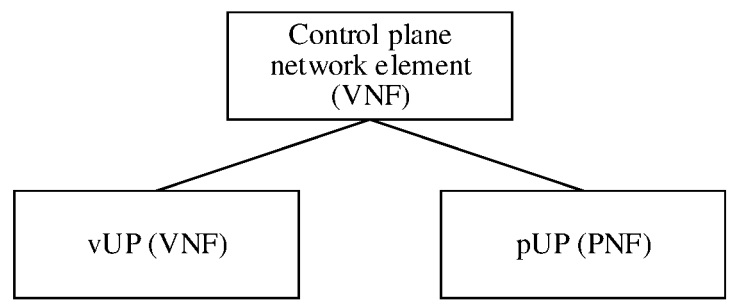
FIG. 1 is a schematic diagram of existence forms of a control plane network element and a user plane network element in a vBNG according to an embodiment of this application.

To make objectives, technical solutions, and advantages of this application clearer, the following further describes implementations of this application in detail with reference to the accompanying drawings.

It should be understood that "a plurality of" in this specification means two or more. In descriptions of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same functions and purposes. A person skilled in the art may understand that the terms such as "first" and "second" are not intended to limit a quantity or an execution sequence, and the terms such as "first" and "second" do not indicate a definite difference.

Before embodiments of this application are described in detail, an application scenario of embodiments of this application is first described.

With development of an SDN technology and an NFV technology, a network architecture of a metropolitan area network evolves from a conventional network-centric network architecture to a data center-centric network architecture. In this evolution process, conventional devices such as network elements evolve from professional to universal. The conventional network elements evolve from professional to universal mainly to implement two types of decoupling: decoupling of a control function from a forwarding function and decoupling of software from hardware.

As a conventional gateway device for accessing a broadband network, a BNG plays an important role in a scenario in which a user accesses the broadband network. The BNG performs user authentication, access control, traffic scheduling, and the like in a process in which the user accesses the broadband network. With emergence of various Internet services, a higher requirement is imposed on a quantity of user sessions supported by the BNG, bandwidth for a user to access a network is improved, and especially, a higher requirement is imposed on externally providing service openness and service programmability by the BNG. Based on these factors, an SDN/NFV-based architecture of the BNG needs to implement the foregoing two types of decoupling.

After the forwarding function of the BNG is decoupled from the control function, the BNG includes one control plane (CP) network element and a plurality of user plane network elements. The control plane network element may manage the plurality of user plane network elements, and perform user, traffic, or resource scheduling between the plurality of user plane network elements. Compared with an integrated-hardware BNG on which decoupling is not performed, the BNG whose forwarding function and control function are decoupled is greatly improved in utilization and reliability.

A conventional BNG needs to provide functions such as user management, authentication, authorization, and accounting (AAA) services, address management, a RADIUS service (where RADIUS is a document protocol for authentication, authorization, and accounting information between a network access server and a shared authentication server, where authentication needs to be performed on a link of the network access server), routing control, a point-to-point protocol over Ethernet (PPPOE) service, a dynamic host configuration protocol (DHCP) service, and a forward engine. These functions that need to be supported by the BNG are deployed on a same hardware device, and the hardware device may be a switch or the like.

The BNG whose forwarding function and control function are decoupled may also be referred to as a vBNG. The vBNG includes the control plane (CP) network element and the plurality of user plane (UP) network elements. The control plane network element is configured to provide functions required by the BNG, such as user management, AAA services, address management, a RADIUS service, a PPPoE service, and a DHCP service. In addition, the control plane network element further needs to provide a user plane management (UP management) function required by the BNG. Any user plane network element is configured to provide functions required by the BNG, such as routing, a multicast service, quality of service (QoS), a forwarding service, an access control list (ACL) service, and a multiprotocol label switching (MPLS)/label distribution protocol (LDP) service. These functions are not described in detail in embodiments of this application. For related content, refer to a standard document.

When a BNG includes one control plane network element and a plurality of user plane network elements, the control plane network element and the user plane network element may be connected through three types of interfaces. The three types of interfaces are as follows:

(i) Primary rate interface (PRi): The PRi is also referred to as a service interface, and may specifically use a virtual extensible local area network-generic protocol encapsulation (VXLAN-GPE) interface. When receiving a user access protocol packet, the user plane network element encapsulates the user access protocol packet through the interface, and then sends the encapsulated user access protocol packet to the control plane network element. The control plane network element processes the user access protocol packet. The user access protocol packet is also referred to as a dial-up request.

(2) Media independent interface (Mi): The Mi is also referred to as a management interface, and may specifically use a network configuration (netconf) interface. The control plane network element delivers a configuration to the user plane network element through the interface. The user plane network element reports some running statuses and the like through the interface.

(3) Serial communications interface (SCi): The SCi is also referred to as a control interface, and may specifically use a control and user plane separation protocol (CUSP) interface. The control plane network element processes a user access protocol packet and completes protocol interaction of a user. After the user dials up, the control plane network element delivers a user entry to a corresponding user plane network element through the interface. The user entry carries user information of a terminal device, so that the user plane network element subsequently forwards traffic of the terminal device based on the user entry. A detailed function of the user entry is described in detail in the following embodiments.

The control plane network element and the user plane network element may have different forms. FIG. 1 is a schematic diagram of existence forms of a control plane network element and a user plane network element in a vBNG according to an embodiment of this application. As shown in FIG. 1, as a virtual network function (VNF), the control plane network element in the vBNG may run on an X86 server to implement virtualization. There may be two forms of the user plane network element in the vBNG. In one form, the user plane network element is used as a VNF and runs on the X86 server. In this case, the user plane network element may also be referred to as a vUP. In another form, the user plane network element is used as a physical network function (PNF) and runs on a conventional hardware network device. In this case, the user plane network element may also be referred to as a pUP. One control plane network element of the vBNG may manage one or more pUPs and one or more vUPs. This is not limited in embodiments of this application.

The control plane network element may manage a large quantity of user plane network elements, and all users are centrally managed on the control plane network element. Therefore, flexible user scheduling between different user plane network elements may be performed based on a quantity of user sessions and a traffic load status. For example, when it is detected that load of a specific user plane network element is heavy, traffic of a terminal device may be steered to another user plane network element for forwarding. This process may also be referred to as user migration, and the user migration is described in detail in the following embodiments.

A fault processing method provided in embodiments of this application is applied to the foregoing scenario in which the forwarding function of the BNG is decoupled from the control function, to provide a network element fault processing method in the scenario.

Figure 2:
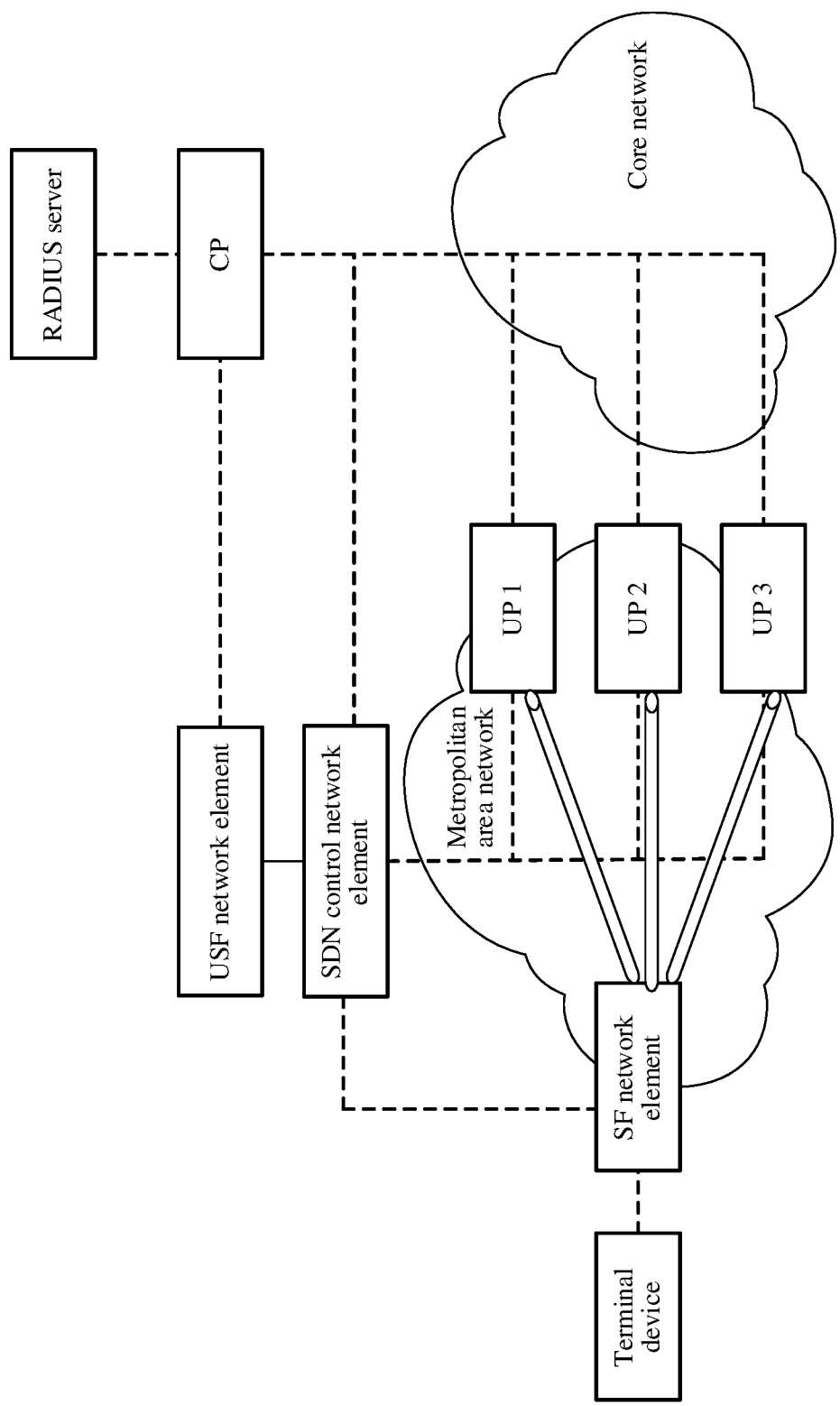
FIG. 2 is a schematic diagram of an architecture of a network according to an embodiment of this application.

FIG. 2 is a schematic diagram of an architecture of a network according to an embodiment of this application. As shown in FIG. 2, the network includes a terminal device, a steering function (SF) network element, an SDN control network element, a user steering function (USF) network element, and a BNG. The BNG includes a control plane network element (where the control plane network element is denoted as a CP in FIG. 2) and a plurality of user plane network elements (where the user plane network element is denoted as a UP in FIG. 2, and FIG. 2 includes three user plane network elements: a UP 1, a UP 2, and a UP 3).

As shown in FIG. 2, the terminal device is connected to the SF network element to implement communication. The SF network element is connected to any user plane network element through a layer 2 tunnel to implement communication. Different physical sub-interfaces are configured on the SF network element. Different physical sub-interfaces match different virtual local area network (VLAN)/QinQ (where QinQ is an expression form of a double VLAN) ranges, and correspond to different layer 2 tunnels. To be specific, different physical sub-interfaces are means to different user plane network elements. In this way, the terminal device may send traffic to a specific user plane network element through a specific physical sub-interface on the SF network element.

The SF network element and the user plane network elements are deployed at an edge of a metropolitan area network, to forward the traffic of the terminal device to a core network.

In addition, as shown in FIG. 2, the SDN control network element is separately connected to the SF network element and the user plane network elements to implement communication. The USF network element is connected to the SDN control network element to implement communication. The control plane network element is separately connected to the USF network element, the SDN control network element, and the user plane network elements to implement communication. In addition, as shown in FIG. 2, the control plane network element is further connected to a RADIUS server to implement communication, to subsequently perform authentication on access of the terminal device through the RADIUS server.

The following describes functions of the network elements shown in FIG. 2.

Control plane network element: The control plane network element is a service control plane of the vBNG, and is configured to: process a dial-up request of the terminal device, and interact with an AAA server for user authentication, accounting, and authorization. The control plane network element may identify a user service level agreement (SLA) based on a user account of the terminal device, notify, by using access line information carried in the dial-up request, the USF network element that the terminal device dials up, and wait for the USF network element to instruct user migration, to map the terminal device to a port accessed by a corresponding user plane network element. In addition, the control plane network element delivers a user entry of the terminal device to the corresponding user plane network element, and the corresponding user plane network element generates a forwarding entry of the terminal device, and advertises a route.

USF network element: is a policy control component for migrating the terminal device to the user plane network element, generates a migration policy based on the user SLA of the terminal device, load, and the like, and notifies the control plane network element and the SF network element to migrate the terminal device, to implement load balancing of the network and meet an SLA requirement.

User plane network element: The user plane network element is a service forwarding plane of the vBNG. The control plane network element delivers the user entry after processing user dial-up. The user plane network element receives the user entry delivered by the control plane network element, locally generates the forwarding entry of the terminal device, performs related service policy execution and traffic forwarding, and advertises the route.

SF network element: is a user access gateway. When the terminal device dials up, the SF network element sends, to the control plane network element through a service channel, the dial-up request sent by the terminal device, so that the control plane network element processes the dial-up request. In addition, the SF network element performs aggregation on a home terminal to aggregate traffic of the terminal device to the user plane network element, forwards a layer 2 packet, and performs VLAN/QINQ (double VLAN) isolation on different terminal devices, so that each terminal device exclusively uses one VLAN/QINQ.

Residential gateway (residential gateway, RGW): is configured to connect a home computer or mobile phone to a network, usually performs network address translation (network address translation, NAT), allocates an Internet protocol (IP) address to the home computer and mobile phone, performs PPPoE-based or IPoE-based dial-up, and obtains an IP address from a vBNG, to perform network access.

SDN control network element: receives the access line information of the corresponding user sent by the control plane network element, where the access line information includes an identifier of an accessed switch/optical line terminal (switch/optical line terminal, SW/OLT), information about an accessed port, virtual local area network (virtual local area network, VLAN) information, and the like; and delivers a migration policy to a corresponding SW/OLT, and maps a port+VLAN/QINQ of the terminal device to a layer 2 tunnel connected to the corresponding user plane network element (where the layer 2 tunnel may be a virtual extensible local area network (VXLAN), may be a virtual leased line (VLL), or may be an Ethernet virtual private network (EVPN)).

Based on the connection relationship between the foregoing network elements and the functions of the network elements, a process of accessing a service in the core network by the terminal device usually includes two basic processes: a user access process and a user migration process. The user access process indicates that the terminal device accesses the network, and the user migration process indicates that the traffic of the terminal device is migrated from a user plane network element to another user plane network element.

For ease of description below, the foregoing two basic processes are first described in detail herein.

(1) User Access Process

As shown in FIG. 2, in a process in which the terminal device accesses the network, the terminal device dials up from the UP 1 by default. In this case, the terminal device sends a control packet, for example, the dial-up request, to the CP through the UP 1 connected to the SF network element. After receiving the dial-up request, the CP exchanges the migration policy of the terminal device with the USF network element. If the USF network element determines, based on the user service level agreement (SLA) of the terminal device, that the terminal device should access the network from the UP 2, the USF network element notifies the CP to deliver the user entry of the terminal device to the UP 2. In addition, the USF notifies the SDN control network element, so that the SDN control network element configures the SF network element, and binds, on the SF network element, the VLAN/QinQ corresponding to the terminal device to a physical sub-interface corresponding to the UP 2, in other words, establishes a binding relationship between the terminal device and the UP 2. A subsequent forwarding packet of the terminal device may be directly forwarded to the UP 2.

Figure 3:
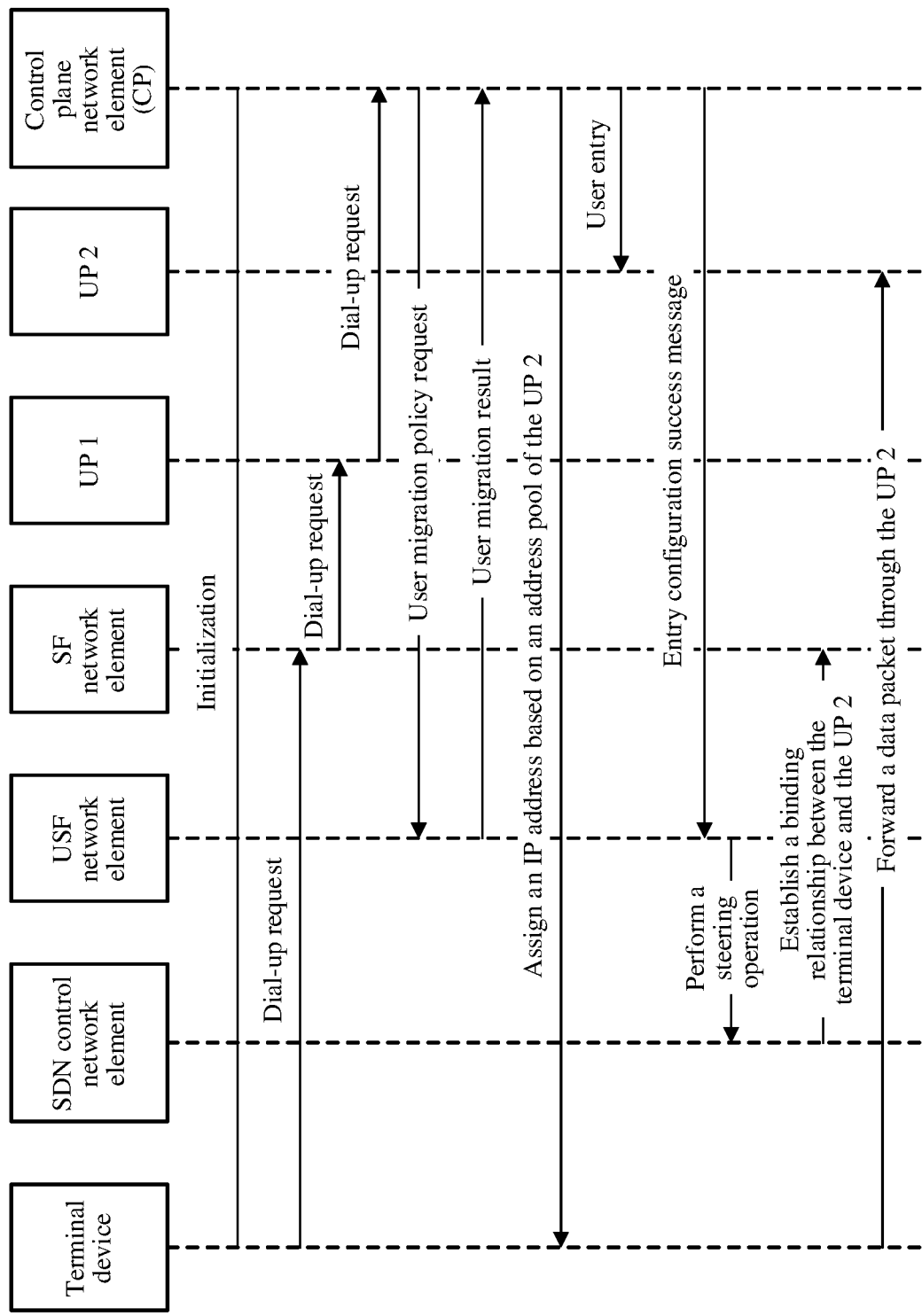
FIG. 3 is a schematic flowchart of network access of a terminal device according to an embodiment of this application.

The foregoing user access process may be specifically shown in a flowchart, namely, FIG. 3. As shown in FIG. 3, the process in which the terminal device accesses the network may be specifically divided into the following several steps.

1. After each network element on the network is initialized, the terminal device sends a PPPoE-based or DHCP-based dial-up request to the SF network element.
2. After receiving the dial-up request, the SF network element sends the dial-up request to the control plane network element (CP) through the default UP 1.
3. After receiving the dial-up request, the control plane network element sends a user migration policy request to the USF network element, where the user migration policy request requests a specific user plane network element through which traffic of the terminal device needs to be forwarded. The user migration policy request may carry a user SLA of the terminal device. The user SLA of the terminal device indicates a priority of a user, and the like.

4. After receiving the user migration policy request, the USF network element determines, based on the user SLA of the terminal device, that the traffic of the terminal device should be forwarded from the UP 2. Therefore, the USF network element returns a user migration result to the control plane network element, where the user migration result indicates that a target UP of the terminal device is the UP 2.

5. After receiving the user migration result, the control plane network element may assign an Internet protocol (IP) address to the terminal device from an address pool of the UP 2, and deliver the assigned IP address to the terminal device, so that the terminal device uses the IP address as a source IP address in the traffic.

6. The control plane network element further delivers a user entry of the terminal device to the UP 2, where the user entry carries user information of the terminal device, and the user information includes information such as the IP address, a MAC address, and an interface of the terminal device. An objective that the control plane network element delivers the user entry of the terminal device to the UP 2 is as follows: The UP 2 subsequently checks validity of a received data packet based on the user entry, for example, checks whether a source media access control (MAC) address and a source IP address in the data packet are the MAC address and the IP address in the locally configured user entry. If yes, the UP 2 continues to forward the data packet; or if no, the UP 2 discards the data packet.

7. After performing the operations 5 and 6, the control plane network element may notify the USF network element of an entry configuration success message.

8. After receiving the entry configuration success message, the USF network element may notify the SDN control network element to perform a steering operation. The steering operation indicates the SDN control network element to configure, on the SF network element, a binding relationship between the terminal device and the UP 2, so that the SF network element subsequently steers the traffic of the terminal device to the UP 2.

9. After the operations 1 to 8 are completed, it indicates that the terminal device has currently accessed the network. The data packet subsequently sent by the terminal device may be forwarded to the core network through the UP 2.

(2) User Migration Process

The user migration process is as follows: After the terminal device accesses the network, if the user SLA of the terminal device changes, the USF network element needs to re-determine a specific user plane network element through which traffic of the terminal device whose user SLA changes needs to be forwarded. For this process, refer to steps 3 to 8 in the foregoing user access process, and details are not described herein again.

It can be learned from the foregoing user access process and user migration process that the USF network element is a policy point for dynamic migration, the control plane network element needs to query the USF network element about whether to perform migration, and the USF network element notifies the control plane network element and the SDN control network element of how to perform migration. Therefore, if a fault occurs on the SF network element, the USF network element, the SDN control network element, and the like shown in FIG. 2, a failure in access or migration of the terminal device is directly caused. The fault processing method provided in embodiments of this application is applied to this scenario. For ease of description below, the SF network element, the USF network element, and the SDN control network element are collectively referred to as a steering decision-making network element.

It should be noted that the USF network element shown in FIG. 2 may be built in the control plane network element, may be built in the SDN control network element, or may be an independent network element. This is not limited in embodiments of this application.

Based on the system architecture shown in FIG. 2, the following describes in detail the fault processing method provided in embodiments of this application. Because network access of the terminal device mainly includes two processes: the user access process and the user migration process, the fault basically occurs in the two processes. Therefore, the following separately describes in detail fault processing in the two processes by using two embodiments.

It should be noted that terms such as first, second, and third in the following embodiments have no specific meaning; and for the terms such as first, second, and third, embodiments are independent of each other. For example, first in an embodiment in FIG. 4 is not associated with first in an embodiment in FIG. 7, second in the embodiment in FIG. 4 is not associated with second in the embodiment in FIG. 7, and third in the embodiment in FIG. 4 is not associated with third in the embodiment in FIG. 7.

Figure 4:
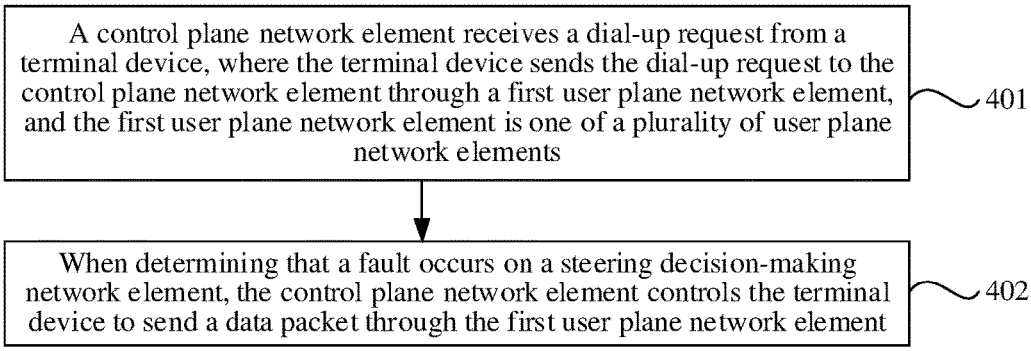
FIG. 4 is a flowchart of a fault processing method according to an embodiment of this application.

FIG. 4 is a flowchart of a fault processing method according to an embodiment of this application. The method is for describing fault processing in a user access process in detail. As shown in FIG. 4, the fault processing method includes the following several steps.

Step 401: A control plane network element receives a dial-up request from a terminal device, where the terminal device sends the dial-up request to the control plane network element through a first user plane network element, and the first user plane network element is one of a plurality of user plane network elements.

In step 401, when the terminal device sends the dial-up request for the first time, the first user plane network element is a preconfigured user plane network element. To be specific, when the terminal device has not accessed a network before a current moment, and if an SF network element receives the dial-up request of the terminal device, the dial-up request is forwarded through the default user plane network element that is configured. The default user plane network element is preconfigured during system initialization. A specific operation of configuring the default user plane network element is not limited in embodiments of this application.

For example, for the system shown in FIG. 2, assuming that the UP 1 is a default user plane network element, when receiving a dial-up request sent by any terminal device for the first time, the SF network element may send the dial-up request to the control plane network element through the UP 1.

When the terminal device sends the dial-up request not for the first time, the first user plane network element is a user plane network element for sending a data packet before the terminal device goes offline last time. In this case, if a user SLA of the terminal device does not change, after the terminal device accesses the network once, user migration may not be performed after the dial-up request subsequently continues to be sent through the user plane network element for last dial-up. This can reduce user migration frequency.

To be specific, after the terminal device goes offline, the terminal device needs to resend the dial-up request to the SF network element if the terminal device dials up again next time. After the SF network element sends the dial-up request, the dial-up request may be forwarded through the recorded user plane network element used before the terminal device goes offline last time.

For example, for the system shown in FIG. 2, assuming that the UP 1 is a default user plane network element, when the SF network element receives a dial-up request sent by any terminal device not for the first time, the SF network element continues to send the dial-up request to the control plane network element through the UP 2 if a UP used before the terminal device goes offline last time is the UP 2.

It can be learned based on the system shown in FIG. 2 that the SF network element, the SDN control network element, and the USF network element are network elements configured to perform scheduling for a user migration process of the terminal device, and these network elements may be integrated into one network element. For ease of description below, these network elements are collectively referred to as a steering decision-making network element. In other words, in embodiments of this application, the steering decision-making network element includes the SF network element, the USF network element, and the SDN control network element.

In embodiments of this application, after the control plane network element receives the dial-up request sent by the terminal device, access fails if a fault occurs on any one of the steering decision-making network elements. To ensure that the terminal device can normally access the network, when detecting that the fault occurs on the steering decision-making network element, the control plane network element may implement the normal access of the terminal device through the following step 402. That the fault occurs on the steering decision-making network element means that the fault occurs on any one or more of the SF network element, the SDN control network element, and the USF network element.

In this embodiment of this application, the control plane network element can actively detect whether the fault occurs on the steering decision-making network element, to subsequently ensure, through step 402, that the terminal device accesses the network. The actively detecting whether the fault occurs on the steering decision-making network element means that the control plane network element can actively send a detection packet to detect whether the fault occurs on the steering decision-making network element. Therefore, in a possible implementation, the fault of the steering decision-making network element includes at least one of the following cases.

(1) After sending a fault detection request to the USF network element, the control plane network element does not receive, within first reference duration, a detection result message returned by the USF network element.

After the control plane network element sends the fault detection request to the USF network element, if the fault occurs on hardware of the USF network element, for example, the USF network element is powered off or disconnected from the network, the USF network element does not respond to the control plane network element. Therefore, the first reference duration may be preconfigured on the control plane network element. If no detection result message returned by the USF network element is received within the first reference duration after the fault detection request is sent to the USF network element, the control plane network element may determine that the fault occurs on the USF network element.

(2) After sending a fault detection request to the USF network element, the control plane network element receives a detection result message returned by the USF network element, where the detection result message indicates that a fault occurs on the USF network element, the SF network element, or the SDN control network element.

If no fault occurs on hardware of the USF network element, but the USF network element detects that a fault occurs on the SF network element or the SDN control network element, or if the fault occurs on a software function module on the USF network element, the USF network element may feed back the detection result message to the control plane network element, where the detection result message indicates that a fault occurs on the USF network element, the SF network element, or the SDN control network element. In this scenario, when receiving the detection result message, the control plane network element may determine that the fault occurs on the USF network element, the SDN control network element, or the SF network element in the steering decision-making network elements.

The foregoing implementation in which the USF network element detects that the fault occurs on the SF network element or the SDN control network element may alternatively be implemented by the USF network element by actively sending a detection packet. Details are not described herein.

(3) After sending a fault detection request to the SDN control network element, the control plane network element does not receive, within second reference duration, a detection result message returned by the SDN control network element.

It can be learned based on the system shown in FIG. 2 that the control plane network element may alternatively directly communicate with the SDN control network element. Therefore, the control plane network element may directly send the fault detection request to the SDN control network element, to detect whether the fault occurs on the SDN network element. After the control plane network element sends the fault detection request to the SDN control network element, if the fault occurs on hardware of the SDN control network element, for example, the SDN control network element is powered off or disconnected from the network, the SDN control network element does not respond to the control plane network element. Therefore, the second reference duration may be preconfigured on the control plane network element. If no detection result message returned by the SDN control network element is received within the second reference duration after the fault detection request is sent to the SDN control network element, the control plane network element may determine that the fault occurs on the SDN control network element.

The second reference duration in this case and the foregoing first reference duration are merely for distinguishing, and have no special meaning. When this embodiment of this application is applied, the first reference duration and the second reference duration may be the same or may be different.

(4) After sending a fault detection request to the SDN control network element, the control plane network element receives a detection result message returned by the SDN control network element, where the detection result message indicates that a fault occurs on the SF network element or the SDN control network element.

If no fault occurs on hardware of the SDN control network element, but the SDN control detects that the fault occurs on the SF network element, or if the fault occurs on a software function module on the SDN control network element, the SDN control network element may feed back the detection result message to the control plane network element, where the detection result message indicates that the fault occurs on the SDN control network element or the SF network element. In this scenario, when receiving the detection result message, the control plane network element may determine that the fault occurs on the SDN control network element or the SF network element in the steering decision-making network elements.

The foregoing implementation in which the SDN control network element detects that the fault occurs on the SF network element may alternatively be implemented by the SDN control network element by actively sending a detection packet. Details are not described herein.

In addition, it can be learned based on the user access process shown in FIG. 3 that after receiving the dial-up request sent by the terminal device, the control plane network element sends a user migration policy request to the USF network element, to request the USF network element to configure a user plane network element for the terminal device. The fault detection requests in the foregoing several fault cases may be sent before the control plane network element sends the user migration policy request to the USF network element. In other words, after receiving the dial-up request of the terminal device, the control plane network element first actively detects whether the fault occurs on the steering decision-making unit. If the fault occurs, it is unnecessary to send the user migration policy request to the USF network element, and the following step 402 is directly performed to ensure that the terminal device normally accesses the network. If no fault occurs, the user migration policy request is sent to the USF network element, to ensure, through the procedure shown in FIG. 3, that the terminal device successfully accesses the network.

Optionally, after receiving the dial-up request of the terminal device, the control plane network element directly sends the user migration policy request to the USF network element, where the user migration policy request also has a function of the fault detection request. If the USF network element does not respond to the user migration policy request because the fault occurs on the hardware of the USF network element, and the control plane network element does not receive a user migration result for the user migration policy request within the first reference duration, it is determined that the fault occurs on the USF network element. Alternatively, after receiving the user migration policy request, the USF network element first determines, in an active detection manner, whether the fault occurs on a software system of the USF network element, the SDN control network element, or the SF network element. If the fault occurs, the USF network element returns the detection result message to the control plane network element. If no fault occurs, it is ensured, through the procedure shown in FIG. 3, that the terminal device successfully accesses the network.

In other words, in the scenario in which the terminal device accesses the network, that the control plane network element determines that the fault occurs on the steering decision-making network may further include the following case: After sending the user migration policy request to the USF network element based on the dial-up request, the control plane network element does not receive, within third reference duration, the user migration result returned by the USF network element, or receives the detection result message returned by the USF network element, where the detection result message indicates that a fault occurs on the USF network element, the SF network element, or the SDN control network element.

Figure 5:
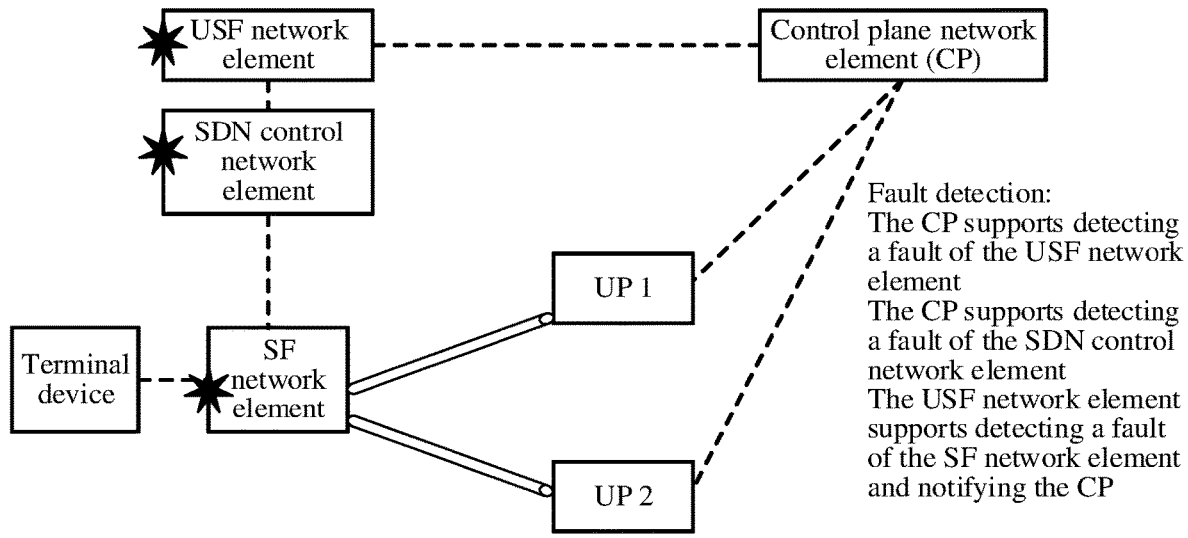
FIG. 5 is a schematic diagram of a fault of a steering decision-making network element according to an embodiment of this application.

FIG. 5 is a schematic diagram of the fault of the steering decision-making network element according to this embodiment of this application. As shown in FIG. 5, that the fault occurs on the steering decision-making network element may mean that the fault occurs on one or more of the USF network element, the SDN network element, and the SF network element. An example in which faults occur on all the USF network element, the SDN network element, and the SF network element is used in FIG. 5 for description. As shown in FIG. 5, the control plane network element supports detecting whether the fault occurs on the USF network element or the SDN control network element, to be specific, detecting, in the foregoing manner of sending the fault detection request, whether the fault occurs on the USF network element or the SDN control network element. In addition, the USF network element supports detecting whether the fault occurs on the SF network element, and notifying the control plane network element of a detection result. In this way, the control plane network element determines, in the active detection manner, that the fault occurs on the fault decision-making network element.

The foregoing content is for describing how the control plane network element determines that the fault occurs on the steering decision-making network element. It should be noted that the foregoing several implementations are merely several optional implementations provided in embodiments of this application. A specific implementation in which the control plane network element determines that the fault occurs on the steering decision-making network element is not limited in embodiments of this application. For example, it may alternatively be determined, in a passive notification manner, that the fault occurs on the steering decision-making network element. To be specific, if another device can detect that the fault occurs on the steering decision-making network element, the another device may notify the control plane network element that the fault occurs on the steering decision-making network element. The another device includes, but is not limited to, a device on which the fault occurs or a device other than the device on which the fault occurs.

Step 402: When determining that the fault occurs on the steering decision-making network element, the control plane network element controls the terminal device to send a data packet through the first user plane network element.

In a process in which the terminal device accesses the network, if the control plane network element determines that the fault occurs on the steering decision-making network element, to ensure that the terminal device can continue to access the network, in this embodiment of this application, the control plane network element may directly control, without decision of the steering decision-making unit, the terminal device to send the data packet through the first user plane network element.

In this case, an implementation process in which the control plane network element controls the terminal device to send the data packet through the first user plane network element may be specifically as follows: The control plane network element sends a user entry to the first user plane network element, where the user entry carries user information of the terminal device, and the first user plane network element forwards the data packet from the terminal device based on the user entry.

In addition, the control plane network element may further send a first IP configuration instruction to the terminal device, where the first IP configuration instruction carries a first IP address, so that the terminal device uses the first IP address as a source IP address to send the data packet. The first IP address is an IP address in an address pool corresponding to the first user plane network element.

Figure 6:
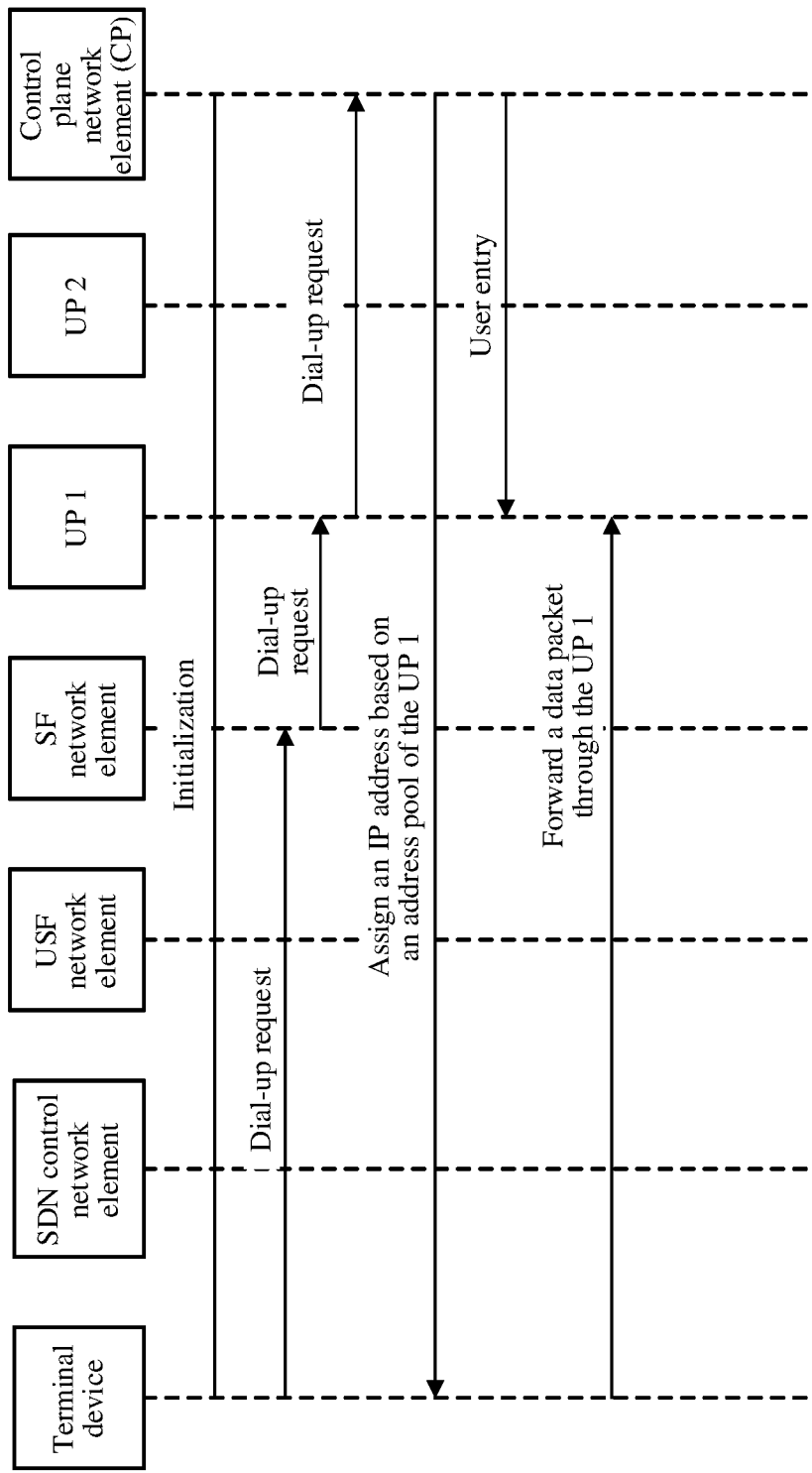
FIG. 6 is a schematic flowchart of accessing a network by a terminal device when a fault occurs on a steering decision-making network element according to an embodiment of this application.

FIG. 6 is a schematic flowchart of accessing a network by a terminal device when a fault occurs on a steering decision-making network element according to an embodiment of this application. As shown in FIG. 6, a process in which the terminal device accesses the network may be specifically divided into the following several steps.

1. After each network element on the network is initialized, the terminal device sends a PPPoE-based or DHCP-based dial-up request to an SF network element.
2. After receiving the dial-up request, the SF network element sends the dial-up request to a control plane network element (CP) through a default UP 1.
3. After receiving the dial-up request, the control plane network element assigns an Internet protocol (IP) address to the terminal device from an address pool of the UP 1 if the control plane network element detects that a fault occurs on a steering decision-making network element, and delivers the assigned IP address to the terminal device, so that the terminal device uses the IP address as a source IP address in traffic.
4. The control plane network element further delivers a user entry of the terminal device to the UP 1, where the user entry carries user information of the terminal device, and the user information includes information such as the IP address, a MAC address, and an interface of the terminal device.
5. After the operations 1 to 4 are completed, it indicates that the terminal device has currently accessed the network. A data packet subsequently sent by the terminal device may be forwarded to a core network through the UP 1.

Compared with the user access procedure shown in FIG. 3, this procedure merely needs the control plane network element to configure the IP address and deliver the user entry when the fault occurs on the steering decision-making network element, to ensure that the terminal device successfully accesses the network, and the steering decision-making network element does not need to perform related configuration.

In other words, when the fault occurs on the steering decision-making network element, the control plane network element controls the terminal device to send the data packet through an initial user plane network element. The initial user plane network element may be a default user plane network element, or may be a user plane network element used before previous go-offline. This ensures that the terminal device continues to access the network when the fault occurs on the steering decision-making network element. However, if a data packet is forwarded always in this manner subsequently, scheduling between the user plane network elements on the network cannot be implemented, and load imbalance between the user plane network elements easily occurs. Therefore, after the fault occurs on the steering decision-making network element, once the control plane network element detects that the fault of the steering decision-making network element is eliminated, the control plane network element triggers the steering decision-making network element to perform user migration on the terminal device, to implement appropriate scheduling between the user plane network elements.

Based on the foregoing idea, in a possible implementation, when detecting that the fault of the steering decision-making network element is eliminated, the control plane network element sends a user migration policy request to the steering decision-making network element, where the user migration policy request indicates the steering decision-making network element to determine whether to steer the user plane network element for forwarding the data packet of the terminal device from the first user plane network element to another user plane network element. The control plane network element receives a user migration result sent by the steering decision-making network element, where the user migration result carries an identifier of a second user plane network element, and the second user plane network element is a user plane network element other than the first user plane network element. The control plane network element sends the user entry to the second user plane network element, where the user entry carries the user information of the terminal device. The second user plane network element forwards the data packet from the terminal device based on the user entry. After receiving an entry configuration success message returned by the second user plane network element, the control plane network element sends the entry configuration success message to the steering decision-making network element, to enable the steering decision-making network element to establish a mapping relationship between the terminal device and the second user plane network element, and forward the data packet of the terminal device to the second user plane network element based on the mapping relationship between the terminal device and the second user plane network element.

After the control plane network element receives the entry configuration success message returned by the second user plane network element, and sends the entry configuration success message to the steering decision-making network element, for an interaction operation between the network elements, refer to FIG. 3. As shown in FIG. 3, after receiving the entry configuration success message returned by the second user plane network element, the control plane network element delivers the entry configuration success message to the USF network element. After receiving the entry configuration success message, the USF network element notifies the SDN control network element to perform a steering operation. The steering operation indicates the SDN control network element to configure, on the SF network element, a binding relationship between the terminal device and the second user plane network element, so that the SF network element subsequently steers traffic of the terminal device to the second user plane network element.

The foregoing implementation in which the control plane network element detects that the fault of the steering decision-making network element is eliminated may also be implemented by actively sending a fault detection request, or may be implemented by using a notification of the steering decision-making network element whose fault is eliminated. In embodiments of this application, how the control plane network element detects that the fault of the steering decision-making network is eliminated is not limited.

In addition, it should be noted that, the elimination of the fault of the steering decision-making network means a case in which a fault occurs on none of the steering decision-making networks, instead of a case in which a fault of a specific network element is eliminated but a fault of another network element still exists. This can ensure that a process in which the control plane network element controls, through the steering decision-making network element whose fault is eliminated, the terminal device to send the data packet through the second user plane network element is successfully implemented.

In conclusion, in this embodiment of this application, in the process in which the terminal device accesses the network, if the control plane network element determines that the fault occurs on the steering decision-making network element, to ensure that the terminal device can continue to access the network, the control plane network element may directly control, without decision of the steering decision-making unit, the terminal device to send the data packet through the first user plane network element for the dial-up request. In other words, this embodiment of this application provides a manner in which the terminal device can continue to access the network when the fault occurs on the steering decision-making network element. To be specific, according to this embodiment of this application, a best-effort path in a single-network-element fault scenario can be implemented, so that the terminal device can still normally dial up.

Figure 7:
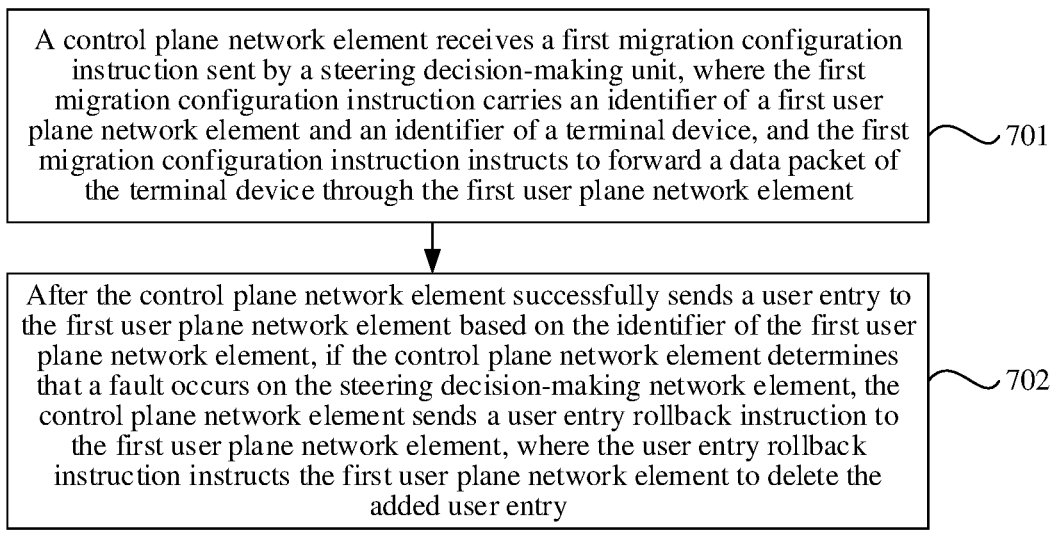
FIG. 7 is a flowchart of another fault processing method according to an embodiment of this application.

FIG. 7 is a flowchart of another fault processing method according to an embodiment of this application. The method is for describing in detail fault processing in a user migration process that is after a user accesses a network. As shown in FIG. 7, the fault processing method includes the following several steps.

Step 701: A control plane network element receives a first migration configuration instruction sent by a steering decision-making unit, where the first migration configuration instruction carries an identifier of a first user plane network element and an identifier of a terminal device, and the first migration configuration instruction instructs to forward a data packet of the terminal device through the first user plane network element.

An application scenario of step 701 may be a process in which the terminal device is successfully connected to the network and accesses the network. In this scenario, if a user SLA of the terminal device changes, because the user SLA includes user information such as a priority of the terminal device, and forwarding needs to be performed by different user plane network elements for terminal devices with different priorities to implement load scheduling between the user plane network elements, when the user SLA of the terminal device changes, the terminal device needs to be migrated, to be specific, traffic of the terminal device is steered to another user plane network element.

Based on the foregoing configuration, in a possible implementation, a scenario in which the control plane network element receives the first migration configuration instruction sent by the steering decision-making unit may be specifically: The control plane network element receives a user SLA change message, where the user SLA change message indicates that user information of the terminal device is updated. The control plane network element forwards the user SLA change message to the steering decision-making network element, to enable the steering decision-making network element to configure the first user plane network element for the terminal device based on updated user information, and send the first migration configuration instruction to the control plane network element.

For example, in the system shown in FIG. 2, after receiving a user SLA change message, the control plane network element forwards the user SLA change message to the USF network element. The USF network element determines, based on the SLA change message, whether the terminal device needs to be migrated to a new user plane network element. If the terminal device needs to be migrated to the new user plane network element, the new user plane network element is used as the first user plane network element, and a first migration configuration instruction is returned to the control plane network element, where the first migration configuration instruction instructs to steer a data packet of the terminal device to the first user plane network element.

It should be noted that, if the USF network element determines, based on the SLA change message, that the terminal device does not need to be migrated to the new user plane network element, the USF network element may send, to the control plane network element, a notification message indicating that the terminal device does not need to be migrated. After receiving the notification message, the control plane network element does not need to perform another operation, and remains in a current state.

Step 702: After the control plane network element successfully sends a user entry to the first user plane network element based on the identifier of the first user plane network element, if the control plane network element determines that a fault occurs on the steering decision-making network element, the control plane network element sends a user entry rollback instruction to the first user plane network element, where the user entry rollback instruction instructs the first user plane network element to delete the added user entry.

After receiving the first migration configuration instruction sent by the steering decision-making network element, the control plane network element determines that the terminal device needs to be migrated to the first user plane network element currently. Therefore, the control plane network element may deliver the user entry to the first user plane network element based on the identifier of the first user plane network element, so that the first user plane network element locally configures the user entry of the terminal device. After completing the configuration, the first user plane network element returns an entry configuration success message to the control plane network element. After receiving the entry configuration success message from the first user plane network element, the control plane network element may determine that the user entry has been successfully delivered to the first user plane network element.

The user entry carries the user information of the terminal device, and the first user plane network element forwards the data packet of the terminal device based on the user entry. A function of the user entry is described in detail in the system architecture shown in FIG. 2, and details are not described herein again.

It can be learned based on the procedure shown in FIG. 3 that, after successfully sending the user entry to the first user plane network element based on the identifier of the first user plane network element, the control plane network element notifies the steering decision-making network element to perform related configuration, so that the steering decision-making network element that has performed configuration steers the traffic of the terminal device to the first user plane network element. Therefore, after the control plane network element successfully sends the user entry to the first user plane network element based on the identifier of the first user plane network element, if the fault occurs on the steering decision-making network, the related configuration performed by the steering decision-making network element fails. In this case, the migration process of the terminal device fails. However, because the user entry of the terminal device has been configured on the first user plane network element, in this case, the user entry configured on the first user plane network element is invalid. This scenario easily causes the terminal device to go offline. Therefore, in this embodiment of this application, to avoid that the terminal device goes offline due to an invalid user entry configured on the first user plane network element, after the control plane network element successfully sends the user entry to the first user plane network element based on the identifier of the first user plane network element, if the control plane network element determines that the fault occurs on the steering decision-making network element, the control plane network element sends the user entry rollback instruction to the first user plane network element, where the user entry rollback instruction instructs the first user plane network element to delete the added user entry. Therefore, the terminal device does not go offline due to the fault of the steering decision-making unit in the user migration process.

In other words, in this embodiment of this application, through the foregoing step 701 and step 702, in the migration process of the terminal device, if the fault occurs on the steering decision-making network element (for example, the fault occurs on one or more of a USF network element, an SDN control network element, or an SF network element), message exchange between the control plane network element and the steering decision-making network fails. In this case, the control plane network element supports rollback of the delivered user entry, to avoid that the terminal device goes offline.

The following describes the fault of the steering decision-making network element in step 702.

After successfully sending the user entry to the first user plane network element based on the identifier of the first user plane network element, the control plane network element notifies the steering decision-making network element to perform related configuration. Therefore, in a possible implementation, the fault of the steering decision-making network element in step 702 includes at least one of the following cases.

(1) After successfully sending the user entry to the first user plane network element based on the identifier of the first user plane network element, the control plane network element sends an entry configuration success message to the USF network element; and after sending the entry configuration success message to the USF, the control plane network element receives, within third reference duration, no message returned by the USF network element.

After the control plane network element sends the entry configuration success message to the USF network element, if the fault occurs on hardware of the USF network element, for example, the USF network element is powered off or disconnected from the network, the USF network element does not respond to the control plane network element. Therefore, the first reference duration may be preconfigured on the control plane network element. If no message returned by the USF network element is received within the first reference duration after the entry configuration success message is sent to the USF network element, the control plane network element may determine that the fault occurs on the USF network element.

(2) After sending the entry configuration success message to the USF network element, the control plane network element receives a migration failure message sent by the USF network element, where the migration failure message indicates that the fault occurs on the USF network element, the SDN control network element, or the SF network element.

If no fault occurs on hardware of the USF network element, but the USF network element detects that the fault occurs on a software function module on the USF, or the USF network element finds, when performing related configuration on the SDN control network element and the SF network element, that the fault occurs on the SF network element or the SDN control network element, the USF network element may feed back the migration failure message to the control plane network element, where the migration failure message indicates that the fault occurs on the USF network element, the SDN control network element, or the SF network element. In this scenario, when receiving the migration failure message, the control plane network element may determine that the fault occurs on the USF network element, the SDN control network element, or the SF network element in the steering decision-making network elements. As a result, the user migration process fails.

That the USF network element finds, when performing related configuration on the SDN control network element and the SF network element, that the fault occurs on the SF network element or the SDN control network element may be specifically: After notifying the SDN control network element to perform a steering operation, the USF network element does not receive any response from the SDN control network element, or receives a steering failure instruction returned by the SDN control network element.

In addition, after the USF network element notifies the SDN control network element to perform the steering operation, in a scenario in which the SF network element completes binding between the terminal device and the first user plane network element under a command of the SDN control network element but does not delete, due to the fault, a binding relationship between the terminal device and another user plane network element that is previously used, or the SF network element deletes a binding relationship between the terminal device and another user plane network element that is previously used but does not complete binding between the terminal device and the first user plane network element due to the fault, where the another user plane network element herein is a user plane network element for sending a data packet before the terminal device is migrated, after the USF network element receives the migration failure message returned by the SDN control network element, the USF network element is further configured to control the SF network element to bind the terminal device to the user plane network element for sending the data packet last time, so that the terminal device continues to send the data packet through the user plane network element for sending the data packet last time.

That is, the USF network element sends a user rollback instruction to the SDN control network element. After receiving the user rollback instruction, the SDN control network element forwards the user rollback instruction to the SF network element. After receiving the user fallback instruction, the SF network element checks a locally configured user plane network element bound to the terminal device, and deletes the binding relationship between the terminal device and the first user plane network element if the binding relationship between the terminal device and the first user plane network element and a binding relationship between the terminal device and the another user plane network element are both locally stored. If only the binding relationship between the terminal device and the first user plane network element is locally stored, the binding relationship between the terminal device and the first user plane network element is deleted, and a binding relationship between the terminal device and the another user plane network element is added. If only a binding relationship between the terminal device and the another user plane network element is locally stored, no operation needs to be performed.

Figure 8:
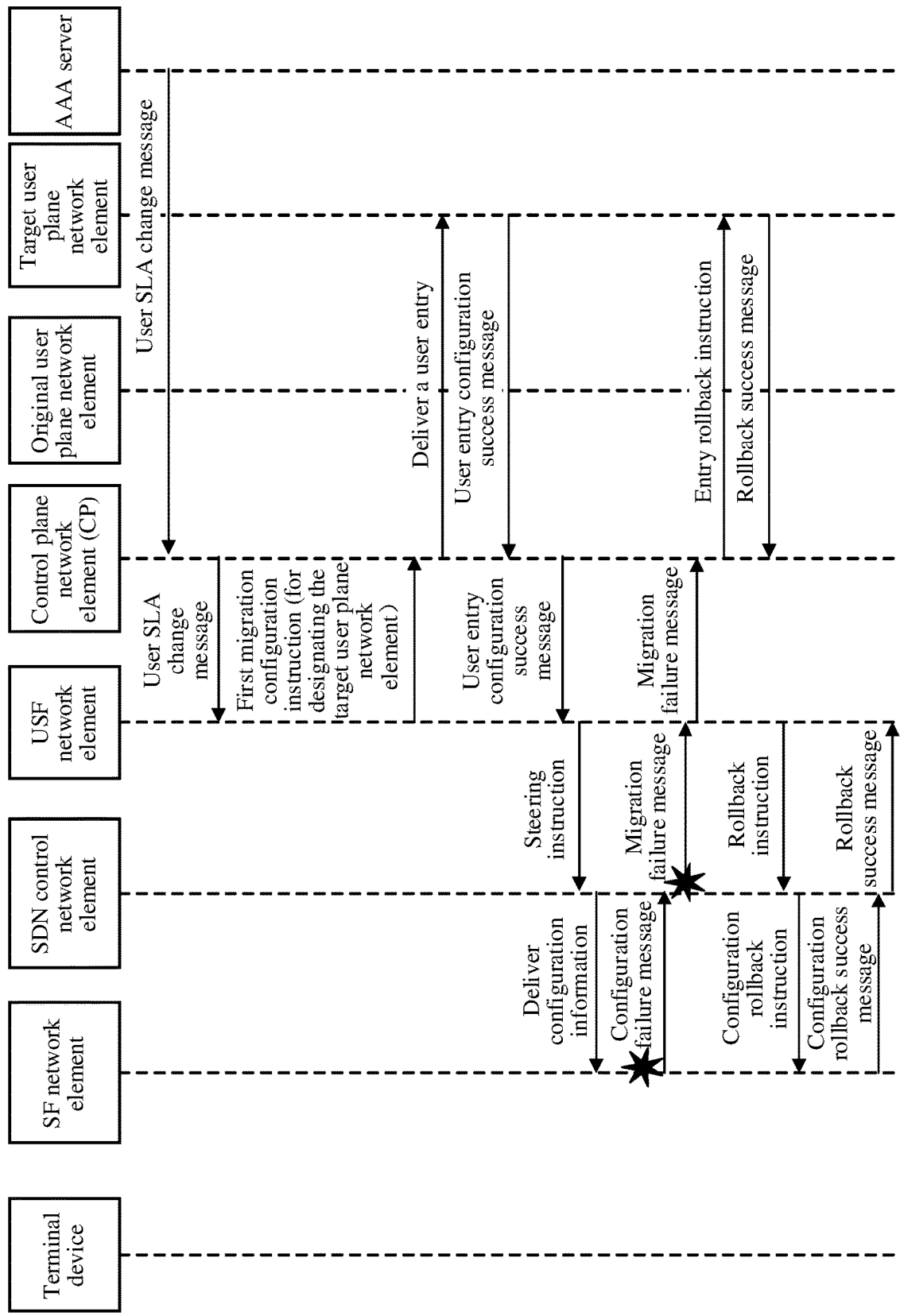
FIG. 8 is a schematic flowchart of fault processing in a user migration process according to an embodiment of this application.

FIG. 8 is a schematic flowchart of fault processing in a user migration process according to an embodiment of this application. For the following description, a user plane network element to which a terminal is migrated is referred to as a target user plane network element, and a user plane network element from which the terminal is migrated is referred to as an original user plane network element. A procedure shown in FIG. 8 includes the following several steps.

1. A control plane network element receives a user SLA change message sent by an AAA server, where the user SLA change message indicates that user information of the terminal device is updated.
2. The control plane network element forwards the user SLA change message to a USF network element, so that the USF network element configures the target user plane network element for the terminal device based on updated user information.
3. The USF network element sends a first migration configuration instruction to the control plane network element, where the first migration configuration instruction carries an identifier of the target user plane network element.
4. After receiving the first migration configuration instruction, the control plane network element delivers a user entry of the terminal device to the target user plane network element.
5. After determining that the user entry of the terminal device is locally configured, the target user plane network element returns an entry configuration success message to the control plane network element.
6. The control plane network element forwards the entry configuration success message to the USF network element, to notify the USF network element that the target user plane network element has completed related configuration.
7. After receiving the entry configuration success message, the USF network element sends a steering instruction to the SDN control network element, where the steering instruction instructs the SDN control network element to perform a steering operation. A purpose of the steering operation is to migrate the terminal device to the target user plane network element.
8. After receiving the steering instruction delivered by the USF network element, the SDN control network element delivers configuration information to the SF network element, where the configuration information indicates the SF network element to locally establish a binding relationship between the terminal device and the target user plane network element, and delete a binding relationship between the terminal device and the original user plane network element.
9. After the SF receives the configuration information, if the SF fails to locally establish the binding relationship between the terminal device and the target user plane network element and fails to delete the binding relationship between the terminal device and the original user plane network element, the SF returns a configuration failure message to the SDN control network element.
10. After receiving the configuration failure message, the SDN control network element returns a migration failure message to the USF network element.
11. After receiving the migration failure message, the USF network element notifies the control plane network element of a migration failure message.
12. After receiving the migration failure message, the control plane network element delivers a user entry rollback instruction to the target user plane network element, where the user entry rollback instruction instructs the target user plane network element to delete the added user entry of the terminal device.
13. After determining that the added user entry of the terminal device is deleted, the target user plane network element returns a rollback success message to the control plane network element.
14. After notifying the control plane network element of the migration failure message, the USF network element further delivers a rollback instruction to the SDN control network element, where the rollback instruction instructs the SF network element to bind the terminal device to the original user plane network element.
15. After receiving the rollback instruction, the SDN control network element delivers a configuration rollback instruction to the SF network element, where the configuration rollback instruction instructs the SF network element to bind the terminal device to the original user plane network element.
16. After receiving the configuration rollback instruction, the SF network element detects a locally stored user plane network element bound to the terminal device, and returns a configuration rollback success message to the SDN control network element after ensuring that the terminal device is bound only to the original user plane network element.
17. After receiving the configuration rollback success message, the SDN control network element returns a rollback success message to the USF network element, to notify the USF network element that the SF network element has bound the terminal device to the original user plane network element.

It should be noted that the procedure shown in FIG. 8 is merely a scenario in which the control plane network element determines that the fault occurs on the steering decision-making network element. For another scenario in which the control plane network element determines that the fault occurs on the steering decision-making network element, examples are not enumerated herein one by one in this embodiment of this application.

In addition, in the foregoing, whether the fault occurs on the steering decision-making network element is determined based on a response status of the steering decision-making network element to the entry configuration success message sent by the control plane network element. Optionally, after successfully sending the user entry to the first user plane network element based on the identifier of the first user plane network element, the control plane network element may alternatively first determine, in an active detection manner, whether the fault occurs on the steering decision-making network element, to avoid, through step 702 after determining that the fault occurs on the steering decision-making network element, that the terminal device goes offline.

Therefore, the fault of the steering decision-making network element in step 702 may further include at least one of the following cases.

(1) After sending a fault detection request to the USF network element, the control plane network element does not receive, within first reference duration, a detection result message returned by the USF network element.

(2) After sending a fault detection request to the USF network element, the control plane network element receives a detection result message returned by the USF network element, where the detection result message indicates that a fault occurs on the USF network element, the SF network element, or the SDN control network element.

(3) After sending a fault detection request to the SDN control network element, the control plane network element does not receive, within second reference duration, a detection result message returned by the SDN control network element.

(4) After sending a fault detection request to the SDN control network element, the control plane network element receives a detection result message returned by the SDN control network element, where the detection result message indicates that a fault occurs on the SF network element or the SDN control network element.

For the foregoing four fault detection cases, specifically refer to the embodiment shown in FIG. 4, and details are not described herein again.

In other words, after successfully sending the user entry to the first user plane network element based on the identifier of the first user plane network element, the control plane network element first actively detects whether the fault occurs on the steering decision-making unit. If the fault occurs, it is unnecessary to send the entry configuration success message to the USF network element, and step 702 is directly performed to avoid that the terminal device goes offline. If no fault occurs, the entry configuration success message is sent to the USF network element, to implement successful migration of the terminal device through interaction between the USF network element, the SDN control network element, and the SF network element.

In addition, in this embodiment of this application, the control plane network element may alternatively actively detect, after receiving the user SLA change message, whether the fault occurs on the steering decision-making network. In this scenario, if the control plane network element has actively detected that the fault occurs on the steering decision-making network, the control plane network element remains in the current state, and does not need to perform any operation, for example, does not need to forward the user SLA change message to the USF network element.

Optionally, after the control plane network element receives the user SLA change message, if the USF network element does not return any migration configuration instruction to the control plane network element within specified duration after the control plane network element sends the user SLA change message to the USF network element, the control plane network element may also determine that the fault occurs on the USF network element. In this case, the control plane network element remains in the current state, and does not need to perform any operation.

Optionally, after the control plane network element receives the user SLA change message, if the USF network element first determines, in an active detection manner after the control plane network element sends the user SLA change message to the USF network element, that the fault occurs on the SDN control network element or the SF network element, the USF network element returns a detection result message to the control plane network element, where the detection result message indicates that the fault occurs on the USF network element, the SDN control network element, or the SF network element. In this case, after receiving the detection result message, the control plane network element also remains in the current state, and does not need to perform any operation.

Figure 9:
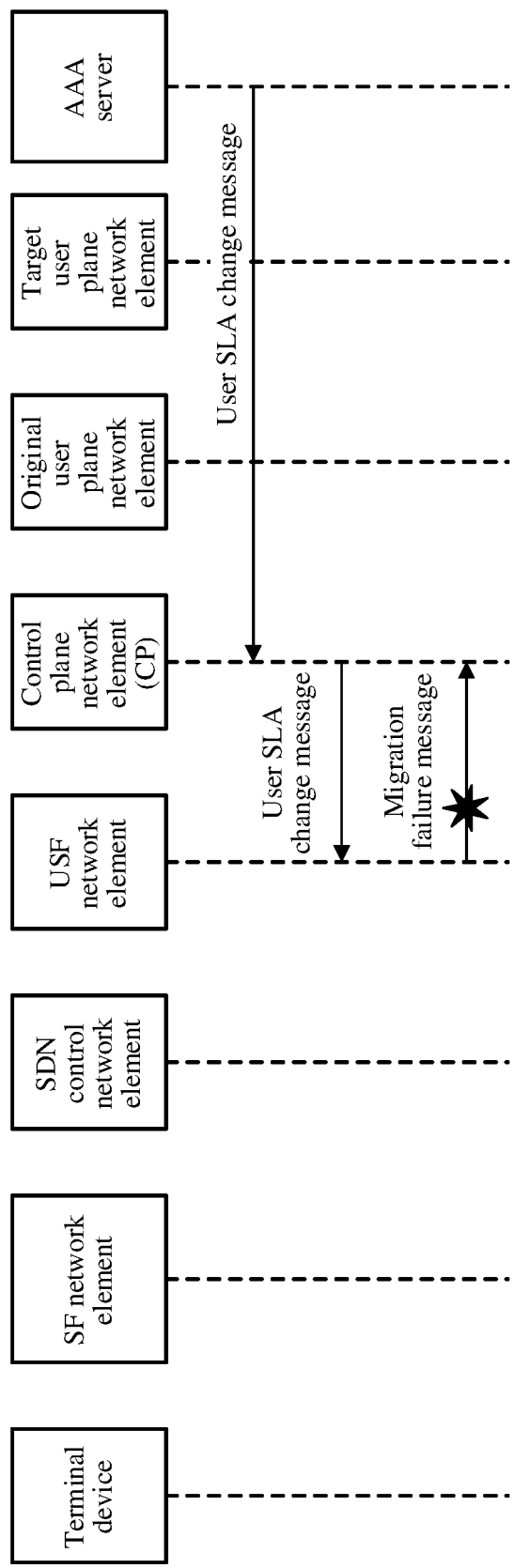
FIG. 9 is another schematic flowchart of fault processing in a migration process according to an embodiment of this application.

FIG. 9 is another schematic flowchart of fault processing in a migration process according to an embodiment of this application. As shown in FIG. 9, a control plane network element receives a user SLA change message sent by an AAA server, and notifies a USF network element that a user SLA of a terminal device changes. In this case, if the control plane network element receives a migration failure message returned by the USF network element, the control plane network element may not need to perform any operation.

In addition, in any one of the foregoing fault scenarios, when the control plane network element determines that the fault of the steering decision-making network element is eliminated, the control plane network element forwards a user SLA change message to the steering decision-making network element, where the user SLA change message indicates that the user information of the terminal device is updated, to enable the steering decision-making network element to configure a second user plane network element for the terminal device based on updated user information, and send, to the control plane network element, a second migration configuration instruction that carries an identifier of the second user plane network element.

Because a moment at which the fault is eliminated is not the same as a moment at which the fault occurs, regardless of which fault occurs, the control plane network element needs to re-trigger an entire user migration procedure. To be specific, the control plane network element needs to forward the user SLA change message to the steering decision-making network element, so that the USF network element in the steering decision-making network elements determines a latest user plane network element based on a current network status and the user SLA change message.

In conclusion, in this embodiment of this application, to avoid that the terminal device goes offline due to a failure in the user migration process, after the control plane network element successfully sends the user entry to the first user plane network element based on the identifier of the first user plane network element, if the control plane network element determines that the fault occurs on the steering decision-making network element, the control plane network element sends the user entry rollback instruction to the first user plane network element, where the user entry rollback instruction instructs the first user plane network element to delete the added user entry. Therefore, the terminal device does not go offline due to the fault of the steering decision-making unit in the user migration process. If it is determined, before the user entry is sent to the first user plane network element based on the identifier of the first user plane network element, that the fault occurs on the steering decision-making network element, no operation needs to be performed, to avoid that the terminal device goes offline.

The embodiment shown in FIG. 7 is applied to a scenario in which the control plane network element triggers the migration of the terminal device. Optionally, in embodiments of this application, the steering decision-making network element may alternatively actively trigger the migration of the terminal device. In this scenario, if the steering decision-making network element determines that the fault occurs on the steering decision-making network element, the migration of the terminal device is not first triggered, but is re-triggered when the fault is eliminated. The following describes in detail a fault processing procedure in this scenario through an embodiment shown in FIG. 10.

Figure 10:
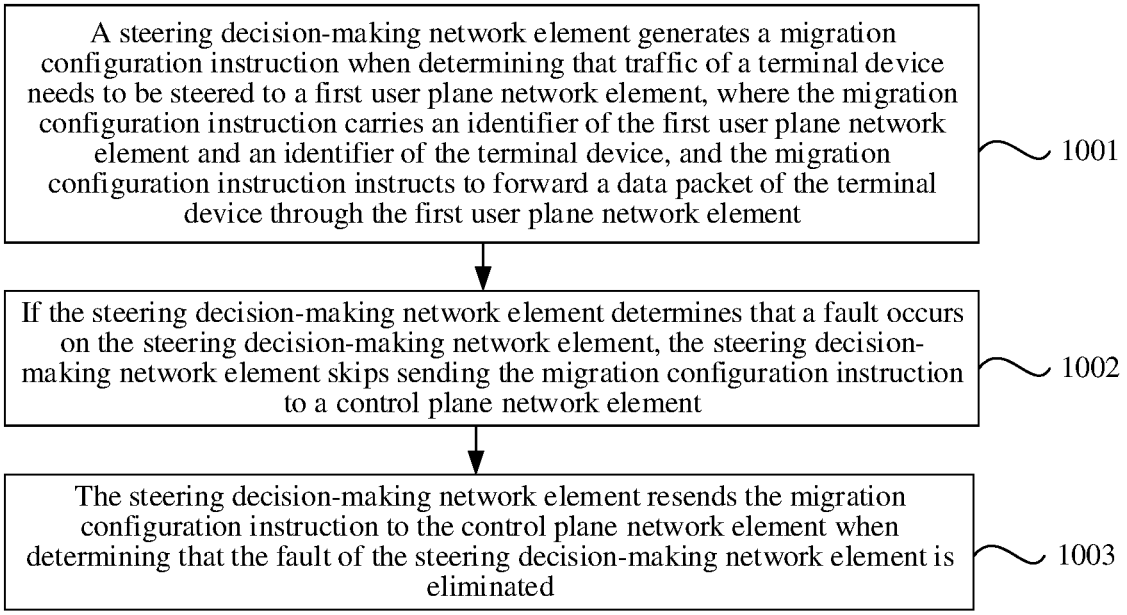
FIG. 10 is a flowchart of another fault processing method according to an embodiment of this application.

FIG. 10 is a flowchart of another fault processing method according to an embodiment of this application. As shown in FIG. 10, the method includes the following several steps.

Step 1001: The steering decision-making network element generates a migration configuration instruction when determining that traffic of a terminal device needs to be steered to a first user plane network element, where the migration configuration instruction carries an identifier of the first user plane network element and an identifier of the terminal device, and the migration configuration instruction instructs to forward a data packet of the terminal device through the first user plane network element.

When determining that the traffic of the terminal device needs to be steered to the first user plane network element, the steering decision-making network element correspondingly generates the migration configuration instruction, to instruct, by using the migration configuration instruction, a control plane network element to deliver a user entry to the first user plane network element, to trigger migration of the terminal device.

In this embodiment of this application, the steering decision-making network element may actively migrate the terminal device in the following two scenarios. In other words, the steering decision-making network element may determine, in the following two implementations, that the traffic of the terminal device needs to be steered to the first user plane network element.

In a possible implementation, when detecting a selection operation for a migration control displayed on a display interface of the steering decision-making network element, the steering decision-making network element determines that the traffic of the terminal device needs to be steered to the first user plane network element, where both the terminal device and the first user plane network element are specified by a user by using the migration control.

Specifically, the migration control is displayed on the display interface of a USF network element, and the user may trigger, by using the migration control, the USF network element to actively migrate the terminal device. For example, when detecting the selection operation for the migration control, the USF network element obtains the identifier of the terminal device and the identifier of the user plane network element that are input by the user through a preset operation, to determine that the terminal device indicated by the identifier of the terminal device needs to be migrated, and the traffic of the terminal device needs to be steered to the user plane network element indicated by the identifier of the user plane network element. The user plane network element indicated by the identifier of the user plane network element that is input by the user through the preset operation is the first user plane network element.

The foregoing uses the USF network element as an example to describe how the steering decision-making network element actively triggers the migration of the terminal device. Optionally, the migration of the terminal device may alternatively be actively triggered by an SDN control network element or an SF network element. For a specific implementation, refer to the implementation process of the USF network element. Examples are not enumerated one by one herein.

In another possible implementation, when detecting that the first user plane network element other than a plurality of user plane network elements is added to a network, the steering decision-making network element determines that the traffic of the terminal device needs to be steered to the first user plane network element.

Specifically, the USF network element monitors configuration statuses of the user plane network elements on the entire network. If it is detected that the first user plane network element is newly added to the network, to implement load balancing, the terminal device may be migrated to the first user plane network element, in other words, the data packet of the terminal device is controlled to be forwarded by the first user plane network element, to steer the traffic of the terminal device to the first user plane network element.

It should be noted that the foregoing two scenarios are merely two examples of scenarios in which the steering decision-making network element actively triggers the migration of the terminal device. A scenario in which the steering decision-making network element actively triggers the terminal device is not limited in embodiments of this application.

Step 1002: If the steering decision-making network element determines that a fault occurs on the steering decision-making network element, the steering decision-making network element skips sending the migration configuration instruction to the control plane network element.

After the steering decision-making network element generates the migration configuration instruction, if the steering decision-making network element determines that the fault occurs on the steering decision-making network element, the migration of the terminal device fails if the steering decision-making network element sends the migration configuration instruction to the control plane network element, and consequently the terminal device goes offline. Therefore, to avoid that the terminal device goes offline due to the migration failure, when determining that the fault occurs on the steering decision-making network element, the steering decision-making network element does not send the migration configuration instruction to the control plane network element, but first caches the migration configuration instruction.

Specifically, after the USF network element generates the migration configuration instruction, if the USF network element determines that the fault occurs on the steering decision-making network element, the USF network element does not send the migration configuration instruction to the control plane network element, but first caches the migration configuration instruction.

That the fault occurs on the steering decision-making network element may include at least one of the following cases.

(1) The USF network element determines that the fault occurs on the USF network element.

For example, when faults occur on some software modules in the USF network element and the USF network element determines that the USF network element cannot complete subsequent migration, the USF network element determines that the fault occurs on the USF network element.

(2) After sending a fault detection request to the SDN network element, the USF network element does not receive, within first reference duration, a detection result message returned by the SDN network element; or after sending a fault detection request to the SDN network element, the USF network element receives a detection result message returned by the SDN network element, where the detection result message indicates that a fault occurs on the SF network element or the SDN control network element.

In this embodiment of this application, the USF network element has a function of actively detecting whether the fault occurs on the SDN control network element.

For example, after the USF network element sends the fault detection request to the SDN network element, if the fault occurs on hardware of the SDN control network element, for example, the SDN control network element is powered off or disconnected from the network, the SDN control network element does not respond to the USF network element. Therefore, the first reference duration may be preconfigured on the USF network element. If no detection result message returned by the SDN control network element is received within the first reference duration after the fault detection request is sent to the SDN control network element, the USF network element may determine that the fault occurs on the SDN control network element in the steering decision-making network elements.

For example, if no fault occurs on hardware of the SDN control network element, but the SDN control network element detects that the fault occurs on the SF network element, or if the fault occurs on a software function module on the SDN control network element, the SDN control network element may feed back the detection result message to the USF network element, where the detection result message indicates that the fault occurs on the SDN control network element or the SF network element. In this scenario, when receiving the detection result message, the USF network element may determine that the fault occurs on the SDN control network element or the SF network element in the steering decision-making network elements.

In the first scenario of active migration triggered by the user in step 1001, if the steering decision-making network element determines that the fault occurs on the steering decision-making network element, in addition to skipping sending the migration configuration instruction to the control plane network element, the steering decision-making network element may further report an error, to notify the user that the currently triggered active migration fails. For example, when determining that the fault occurs on a specific network element in the steering decision-making network elements, the USF network element displays an alarm prompt, where the alarm prompt indicates that the migration of the terminal device cannot be completed currently.

Step 1003: The steering decision-making network element resends the migration configuration instruction to the control plane network element when determining that the fault of the steering decision-making network element is eliminated.

When determining that the fault of the steering decision-making network element is eliminated, the steering decision-making network element may resend the migration configuration instruction to the control plane network element, to trigger a subsequent migration operation. For example, when determining that all the steering decision-making network elements have worked normally, the USF network element resends the migration configuration instruction to the control plane network element. For a related operation performed by the control plane network element after the control plane network element receives the migration configuration instruction, refer to the related operation in FIG. 3 performed by the control plane network element after the control plane network element receives the user migration result sent by the USF network element. Details are not described herein again.

In conclusion, in the scenario in which the steering decision-making network element actively triggers the migration of the terminal device, if the steering decision-making network element can detect that the fault occurs on the steering decision-making network element, the subsequent operation of the migration is not triggered currently, but is re-triggered when the fault is eliminated, thereby avoiding that the terminal device goes offline because the triggered migration fails in the scenario in which the fault occurs on the steering decision-making network element.

Figure 11:
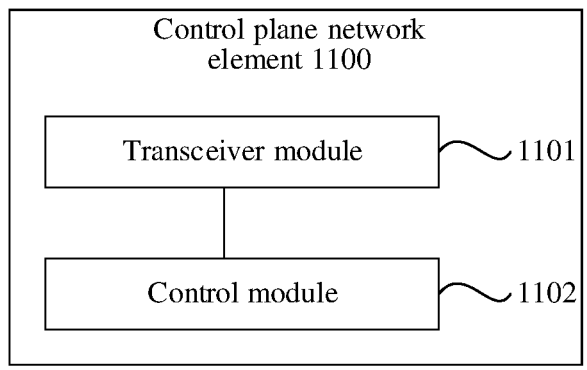
FIG. 11 is a schematic diagram of a structure of a control plane network element according to an embodiment of this application.

FIG. 11 is a schematic diagram of a structure of a control plane network element according to an embodiment of this application. The control plane network element is a control plane network element included in a broadband network gateway BNG on a network, the BNG further includes a plurality of user plane network elements, the network further includes a steering decision-making network element and a terminal device, and the steering decision-making network element is configured to steer traffic of the terminal device to one of the plurality of user plane network elements.

As shown in FIG. 11, the control plane network element 1100 includes: a transceiver module 1101, configured to receive a dial-up request from the terminal device, where the terminal device sends the dial-up request to the control plane network element through a first user plane network element, and the first user plane network element is one of the plurality of user plane network elements; and for a specific implementation, refer to step 401 in the embodiment in FIG. 4; and a control module 1102, configured to: when it is determined that a fault occurs on the steering decision-making network element, control the terminal device to send a data packet through the first user plane network element, where for a specific implementation, refer to step 402 in the embodiment in FIG. 4.

Optionally, the control module is configured to: send, by the control plane network element, a user entry to the first user plane network element, where the user entry carries user information of the terminal device, and the first user plane network element forwards the data packet from the terminal device based on the user entry.

Optionally, the steering decision-making network element includes any one or more of a steering function SF network element, a user steering function USF network element, and a software-defined networking SDN control network element.

The fault of the steering decision-making network element includes at least one of the following cases:

After sending a fault detection request to the USF network element, the transceiver module does not receive, within first reference duration, a detection result message returned by the USF network element; or after sending a fault detection request to the USF network element, the transceiver module receives a detection result message returned by the USF network element, where the detection result message indicates that a fault occurs on the USF network element, the SF network element, or the SDN control network element.

Alternatively, after sending a fault detection request to the SDN control network element, the transceiver module does not receive, within second reference duration, a detection result message returned by the SDN control network element; or after sending a fault detection request to the SDN control network element, the transceiver module receives a detection result message returned by the SDN control network element, where the detection result message indicates that a fault occurs on the SF network element or the SDN control network element.

Alternatively, after sending a user migration policy request to the USF network element based on the dial-up request, the transceiver module does not receive, within third reference duration, a user migration result returned by the USF network element, or the transceiver module receives a detection result message returned by the USF network element, where the detection result message indicates that a fault occurs on the USF network element, the SF network element, or the SDN control network element.

Optionally, after the control module controls the terminal device to send the data packet through the first user plane network element, the transceiver module is further configured to:

receive a user migration result sent by the steering decision-making network element after the fault is eliminated, where the user migration result carries an identifier of a second user plane network element, and the second user plane network element is a user plane network element other than the first user plane network element;

send the user entry to the second user plane network element, where the user entry carries the user information of the terminal device, and the second user plane network element forwards the data packet from the terminal device based on the user entry; and after receiving an entry configuration success message returned by the second user plane network element, send the entry configuration success message to the steering decision-making network element, to enable the steering decision-making network element to establish a mapping relationship between the terminal device and the second user plane network element, and forward the data packet of the terminal device to the second user plane network element based on the mapping relationship between the terminal device and the second user plane network element.

Optionally, when the terminal device sends the dial-up request for the first time, the first user plane network element is a preconfigured user plane network element.

When the terminal device sends the dial-up request not for the first time, the first user plane network element is a user plane network element for sending a data packet before the terminal device goes offline last time.

In conclusion, in this embodiment of this application, in a process in which the terminal device accesses the network, if the control plane network element determines that the fault occurs on the steering decision-making network element, to ensure that the terminal device can continue to access the network, the control plane network element may directly control, without decision of the steering decision-making unit, the terminal device to send the data packet through the first user plane network element for the dial-up request. In other words, this embodiment of this application provides a manner in which the terminal device can continue to access the network when the fault occurs on the steering decision-making network element. To be specific, according to this embodiment of this application, a best-effort path in a single-network-element fault scenario can be implemented, so that the terminal device can still normally dial up.

It should be noted that, when the control plane network element provided in the foregoing embodiments performs fault processing, division into the foregoing functional modules is used only as an example for description. During actual application, the foregoing functions may be allocated to different functional modules for implementation as required, in other words, an internal structure of a device is divided into different functional modules, to implement all or a part of the functions described above. In addition, the control plane network element provided in the foregoing embodiment and the fault processing method embodiment shown in FIG. 4 belong to a same concept. For a specific implementation process thereof, refer to the method embodiment. Details are not described herein again.

Figure 12:
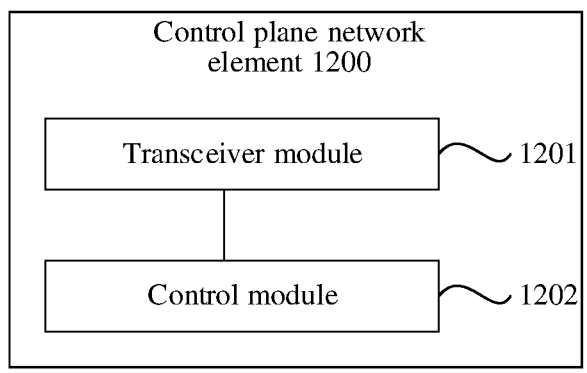
FIG. 12 is a schematic diagram of a structure of another control plane network element according to an embodiment of this application.

FIG. 12 is a schematic diagram of a structure of a control plane network element according to an embodiment of this application. The control plane network element is a control plane network element included in a broadband network gateway BNG on a network, the BNG further includes a plurality of user plane network elements, the network further includes a steering decision-making network element and a terminal device, and the steering decision-making network element is configured to steer traffic of the terminal device to one of the plurality of user plane network elements.

As shown in FIG. 12, the control plane network element 1200 includes:

a transceiver module 1201, configured to receive a first migration configuration instruction sent by the steering decision-making unit, where the first migration configuration instruction carries an identifier of a first user plane network element and an identifier of the terminal device, and the first migration configuration instruction instructs to forward a data packet of the terminal device through the first user plane network element. For a specific implementation, refer to step 701 in the embodiment in FIG. 7.

The transceiver module 1201 is further configured to: after a user entry is successfully sent to the first user plane network element based on the identifier of the first user plane network element, if it is determined that a fault occurs on the steering decision-making network element, send a user entry rollback instruction to the first user plane network element, where the user entry rollback instruction instructs the first user plane network element to delete the added user entry. For a specific implementation, refer to step 702 in the embodiment in FIG. 7.

The user entry carries user information of the terminal device, and the first user plane network element forwards the data packet of the terminal device based on the user entry.

Optionally, the steering decision-making network element includes any one or more of a steering function SF network element, a user steering function USF network element, and a software-defined networking SDN control network element.

The fault of the steering decision-making network element includes at least one of the following cases:

After sending a fault detection request to the USF network element, the transceiver module does not receive, within first reference duration, a detection result message returned by the USF network element; or after sending a fault detection request to the USF network element, the transceiver module receives a detection result message returned by the USF network element, where the detection result message indicates that a fault occurs on the USF network element, the SF network element, or the SDN control network element.

Alternatively, after sending a fault detection request to the SDN control network element, the transceiver module does not receive, within second reference duration, a detection result message returned by the SDN control network element; or after sending a fault detection request to the SDN control network element, the transceiver module receives a detection result message returned by the SDN control network element, where the detection result message indicates that a fault occurs on the SF network element or the SDN control network element.

Alternatively, after successfully sending the user entry to the first user plane network element based on the identifier of the first user plane network element, the transceiver module sends an entry configuration success message to the USF network element; and after sending the entry configuration success message to the USF, the transceiver module receives, within third reference duration, no message returned by the USF network element; or after sending the entry configuration success message to the USF, the transceiver module receives a migration failure message sent by the USF network element, where the migration failure message indicates that the fault occurs on the USF network element, the SDN control network element, or the SF network element.

Optionally, when the fault occurs on the SDN control network element or the SF network element, the USF network element is configured to control the SF network element to bind the terminal device to a user plane network element for sending a data packet last time, so that the terminal device continues to send the data packet through the user plane network element for sending the data packet last time.

Optionally, before the transceiver module receives the first migration configuration instruction sent by the steering decision-making unit, the transceiver module is further configured to: receive a user service level agreement SLA change message, where the user SLA change message indicates that user information of the terminal device is updated; and forward the user SLA change message to the steering decision-making network element, to enable the steering decision-making network element to configure the first user plane network element for the terminal device based on updated user information, and send the first migration configuration instruction to the control plane network element.

Optionally, the control plane network element further includes a control module 1202, configured to: after the transceiver module receives the user SLA change message, and when it is determined that the fault occurs on the steering decision-making network element, remain in a current state.

Optionally, the steering decision-making network element includes any one or more of a steering function SF network element, a user steering function USF network element, and a software-defined networking SDN control network element.

The fault of the steering decision-making network element includes at least one of the following cases:

After sending a fault detection request to the USF network element, the transceiver module does not receive, within fifth reference duration, a detection result message returned by the USF network element; or after sending a fault detection request to the USF network element, the transceiver module receives a detection result message returned by the USF network element, where the detection result message indicates that a fault occurs on the USF network element, the SF network element, or the SDN control network element.

Alternatively, after sending a fault detection request to the SDN control network element, the transceiver module does not receive, within sixth reference duration, a detection result message returned by the SDN control network element; or after sending a fault detection request to the SDN control network element, the transceiver module receives a detection result message returned by the SDN control network element, where the detection result message indicates that a fault occurs on the SF network element or the SDN control network element.

Alternatively, after forwarding the user SLA change message to the USF network element, the transceiver module receives, within fourth reference duration, no message returned by the USF network element; or after forwarding the user SLA change message to the USF network element, the transceiver module receives a detection result message sent by the USF network element, where the detection result message indicates that the fault occurs on the USF network element, the SDN control network element, or the SF network element.

Optionally, the transceiver module is further configured to:

when it is determined that the fault of the steering decision-making network element is eliminated, forward a user SLA change message to the steering decision-making network element, where the user SLA change message indicates that the user information of the terminal device is updated, to enable the steering decision-making network element to configure a second user plane network element for the terminal device based on updated user information, and send, to the control plane network element, a second migration configuration instruction that carries an identifier of the second user plane network element.

In conclusion, in this embodiment of this application, to avoid that the terminal device goes offline due to a failure in a user migration process, after the control plane network element successfully sends the user entry to the first user plane network element based on the identifier of the first user plane network element, if the control plane network element determines that the fault occurs on the steering decision-making network element, the control plane network element sends the user entry rollback instruction to the first user plane network element, where the user entry rollback instruction instructs the first user plane network element to delete the added user entry. Therefore, the terminal device does not go offline due to the fault of the steering decision-making unit in the user migration process. If it is determined, before the user entry is sent to the first user plane network element based on the identifier of the first user plane network element, that the fault occurs on the steering decision-making network element, no operation needs to be performed, to avoid that the terminal device goes offline.

It should be noted that, when the control plane network element provided in the foregoing embodiment performs fault processing, division into the foregoing functional modules is used only as an example for description. During actual application, the foregoing functions may be allocated to different functional modules for implementation as required, in other words, an internal structure of a device is divided into different functional modules, to implement all or a part of the functions described above. In addition, the control plane network element provided in the foregoing embodiment and the fault processing method embodiment shown in FIG. 7 belong to a same concept. For a specific implementation process thereof, refer to the method embodiment. Details are not described herein again.

Figure 13:
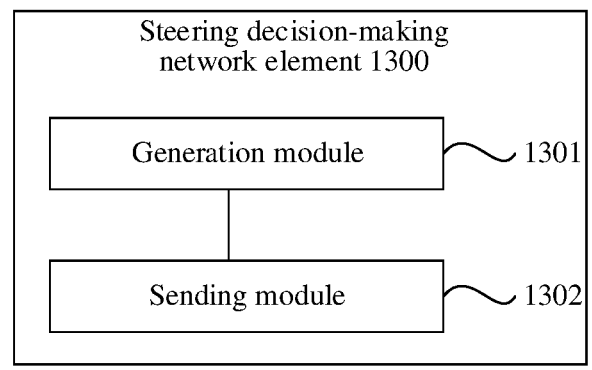
FIG. 13 is a schematic diagram of a structure of a steering decision-making network element according to an embodiment of this application.

FIG. 13 is a schematic diagram of a structure of a steering decision-making network element according to an embodiment of this application. A network further includes a BNG and a terminal device, the BNG includes a control plane network element and a plurality of user plane network elements, and the steering decision-making network element is configured to steer traffic of the terminal device to one of the plurality of user plane network elements.

As shown in FIG. 13, the steering decision-making network element 1300 includes:

a generation module 1301, configured to generate a migration configuration instruction when it is determined that the traffic of the terminal device needs to be steered to a first user plane network element, where the migration configuration instruction carries an identifier of the first user plane network element and an identifier of the terminal device, and the migration configuration instruction instructs to forward a data packet of the terminal device through the first user plane network element; and for a specific implementation, refer to step 1001 in the embodiment in FIG. 10; and a sending module 1302, configured to: if the steering decision-making network element determines that a fault occurs on the steering decision-making network element, skip sending the migration configuration instruction to the control plane network element; and when the steering decision-making network element determines that the fault of the steering decision-making network element is eliminated, resend the migration configuration instruction to the control plane network element; and for a specific implementation, refer to step 1002 and step 1003 in the embodiment in FIG. 10.

Optionally, the steering decision-making network element includes any one or more of a steering function SF network element, a user steering function USF network element, and a software-defined networking SDN control network element.

The fault of the steering decision-making network element includes at least one of the following cases:

The USF network element determines that the fault occurs on the USF network element.

Alternatively, after sending a fault detection request to the SDN network element, the USF network element does not receive, within first reference duration, a detection result message returned by the SDN network element; or after sending a fault detection request to the SDN network element, the USF network element receives a detection result message returned by the SDN network element, where the detection result message indicates that a fault occurs on the SF network element or the SDN control network element.

Optionally, the steering decision-making network element further includes a determining module, configured to:

when a selection operation for a migration control displayed on a display interface of the steering decision-making network element is detected, determine that the traffic of the terminal device needs to be steered to the first user plane network element, where both the terminal device and the first user plane network element are specified by a user by using the migration control; or when it is detected that the first user plane network element other than the plurality of user plane network elements is added to the network, determine that the traffic of the terminal device needs to be steered to the first user plane network element.

In conclusion, in a scenario in which the steering decision-making network element actively triggers migration of the terminal device, if the steering decision-making network element can detect that the fault occurs on the steering decision-making network element, a subsequent operation of the migration is not triggered currently, but is re-triggered when the fault is eliminated, thereby avoiding that the terminal device goes offline because the triggered migration fails in a scenario in which the fault occurs on the steering decision-making network element.

It should be noted that, when the steering decision-making network element provided in the foregoing embodiment performs fault processing, division into the foregoing functional modules is used only as an example for description. During actual application, the foregoing functions may be allocated to different functional modules for implementation as required, in other words, an internal structure of a device is divided into different functional modules, to implement all or a part of the functions described above. In addition, the steering decision-making provided in the foregoing embodiment and the fault processing method embodiment shown in FIG. 10 belong to a same concept. For a specific implementation process thereof, refer to the method embodiment. Details are not described herein again.

Figure 14:
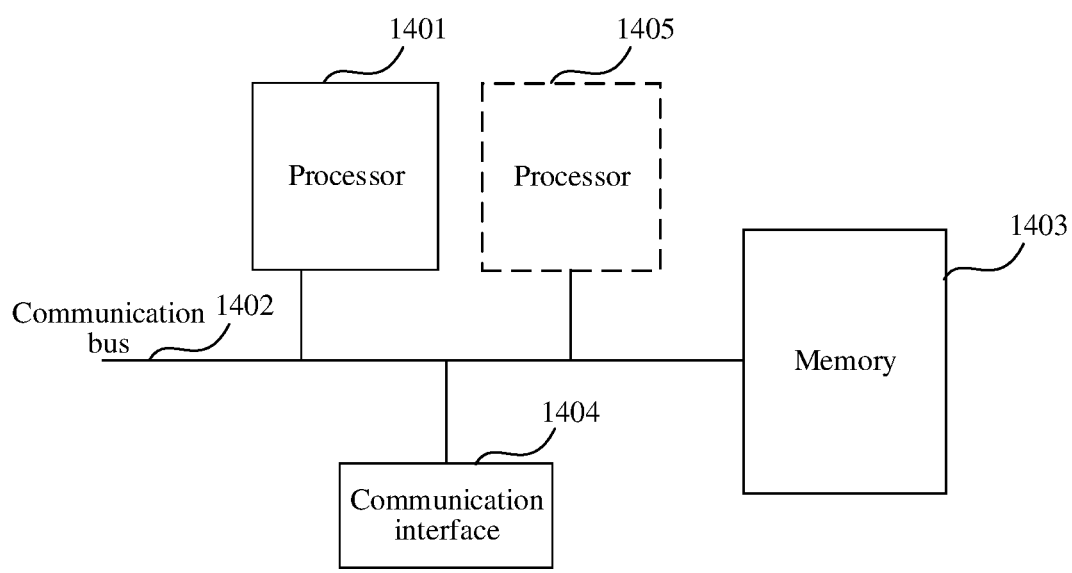
FIG. 14 is a schematic diagram of a structure of a network device according to an embodiment of this application.

FIG. 14 is a schematic diagram of a structure of a network device according to an embodiment of this application. Any network element in the foregoing embodiments may be implemented by using the network device shown in FIG. 14. Refer to FIG. 14. The network device includes at least one processor 1401, a communication bus 1402, a memory 1403, and at least one communication interface 1404.

The processor 1401 may be a general-purpose central processing unit (central processing unit, CPU), an application-specific integrated circuit (application-specific integrated circuit, ASIC), or one or more integrated circuits configured to control program execution of the solutions in this application.

The communication bus 1402 may include a path for transmitting information between the foregoing components.

The memory 1403 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage device, an optical disc storage device (including a compact disc, a laser disc, an optical disc, a digital versatile disc, a Blu-ray disc, or the like), a magnetic disk or another magnetic storage device, or any other medium that can be configured to carry or store expected program code in a form of an instruction or a data structure and that is accessible to a computer, but is not limited thereto. The memory 1403 may exist independently and be connected to the processor 1401 via the communication bus 1402. Alternatively, the memory 1403 may be integrated with the processor 1401.

The memory 1403 is configured to store program code for executing the solutions of this application, and the processor 1401 controls the execution. The processor 1401 is configured to execute the program code stored in the memory 1403. The program code may include one or more software modules. The control plane network element in the BNG may determine, by using the processor 1401 and one or more software modules in the program code in the memory 1403, data for application development.

The communication interface 1404 is configured to communicate with another device or a communication network, for example, an Ethernet, a radio access network (RAN), or a wireless local area network (WLAN) by using any transceiver-type apparatus.

During specific implementation, in an embodiment, the network device may include a plurality of processors, for example, the processor 1401 and a processor 1405 shown in FIG. 14. Each of the processors may be a single-core (single-CPU) processor or a multi-core (multi-CPU) processor. The processor herein may be one or more devices, circuits, and/or processing cores configured to process data (for example, computer program instructions).

The foregoing network device may be a general-purpose network device or a special-purpose network device. During specific implementation, the network device may be a switch, a router, or the like.

All or a part of the foregoing embodiments may be implemented by software, hardware, firmware, or any combination thereof. When software is used to implement embodiments, all or a part of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, an optical disc, or the like.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A network device, comprising:
   one or more memories configured to store instructions; and
   one or more processors coupled to the one or more memories, wherein:
   the network device is applied to a control plane network element of a broadband network gateway (BNG) in a network,
   the BNG further comprises a plurality of user plane network elements,
   the network further comprises a steering decision-making network element and a terminal device,
   the steering decision-making network element is configured to steer traffic of the terminal device to the plurality of user plane network elements, and
   the one or more processors are configured to execute the instructions to cause the network device to:
   receive a dial-up request from the terminal device, wherein the terminal device sends the dial-up request to the control plane network element through a first user plane network element, and the first user plane network element is comprised in one of the plurality of user plane network elements; and
   when determining that a fault occurs on the steering decision-making network element, control the terminal device to send a data packet through the first user plane network element.

2. The network device according to claim 1, wherein the one or more processors are further configured to execute the instructions to cause the network device to:
   send a user entry to the first user plane network element, wherein the user entry comprises user information of the terminal device, and the first user plane network element forwards the data packet from the terminal device based on the user entry.

3. The network device according to claim 1, wherein:
   the steering decision-making network element comprises any one or more of a steering function (SF) network element, a user steering function (USF) network element, or a software-defined networking (SDN) control network element, and
   determining that the fault occurs on the steering decision-making network element comprises at least one of the following:
   after sending a fault detection request to the USF network element, failing to receive, by the control plane network element, within first reference duration, a detection result message returned by the USF network element, or
   after sending a fault detection request to the USF network element, receiving, by the control plane network element, a detection result message returned by the USF network element, wherein the detection result message indicates that the fault occurs on the USF network element, the SF network element, or the SDN control network element.

4. The network device according to claim 1, wherein:
   the steering decision-making network element comprises any one or more of a steering function (SF) network element, a user steering function (USF) network element, or a software-defined networking (SDN) control network element, and
   determining that the fault occurs on the steering decision-making network element comprises at least one of the following:
   after sending a fault detection request to the SDN control network element, failing to receive, by the control plane network element, within second reference duration, a detection result message returned by the SDN control network element, or
   after sending a fault detection request to the SDN control network element, receiving, by the control plane network element, a detection result message returned by the SDN control network element, wherein the detection result message indicates that the fault occurs on the SF network element or the SDN control network element.

5. The network device according to claim 1, wherein:
   the steering decision-making network element comprises any one or more of a steering function (SF) network element, a user steering function (USF) network element, or a software-defined networking (SDN) control network element, and
   determining that the fault occurs on the steering decision-making network element comprises at least one of the following:
   after sending a user migration policy request to the USF network element based on the dial-up request, failing to receive, by the control plane network element, within third reference duration, a user migration result returned by the USF network element, or after sending a user migration policy request to the USF network element based on the dial-up request, receiving, by the control plane network element, a detection result message returned by the USF network element, wherein the detection result message indicates that the fault occurs on the USF network element, the SF network element, or the SDN control network element.

6. The network device according to claim 1, wherein the one or more processors are further configured to execute the instructions to cause the network device to:

receive a user migration result sent by the steering decision-making network element after the fault is eliminated, wherein the user migration result comprises an identifier of a second user plane network element of the plurality of user plane network elements;

send a user entry to the second user plane network element, wherein the user entry comprises user information of the terminal device, and the second user plane network element forwards the data packet from the terminal device based on the user entry; and after receiving an entry configuration success message returned by the second user plane network element, send the entry configuration success message to the steering decision-making network element, wherein, in response to receiving the entry configuration success message: the steering decision-making network element establishes a mapping relationship between the terminal device and the second user plane network element, and forwards the data packet of the terminal device to the second user plane network element based on the mapping relationship between the terminal device and the second user plane network element.

7. The network device according to claim 1, wherein:

when the terminal device sends the dial-up request for the first time, the first user plane network element is a preconfigured user plane network element; or when the terminal device sends the dial-up request not for the first time, the first user plane network element is a previously used user plane network element used by the terminal device for sending data packets before going offline.

8. A network device, comprising:

one or more memories configured to store instructions; and one or more processors coupled to the one or more memories, wherein:

the network device is applied to a control plane network element in a broadband network gateway (BNG) in a network, the BNG further comprises a plurality of user plane network elements, the network further comprises a steering decision-making network element and a terminal device, the steering decision-making network element is configured to steer traffic of the terminal device to one of the plurality of user plane network elements, and the one or more processors are configured to execute the instructions to cause the network device to:

receive a first migration configuration instruction sent by the steering decision-making network element, wherein the first migration configuration instruction comprises an identifier of a first user plane network element and an identifier of the terminal device, and an instruction to forward a data packet of the terminal device through the first user plane network element; and after the control plane network element successfully sends a user entry to the first user plane network element based on the identifier of the first user plane network element, when the control plane network element determines that a fault occurs on the steering decision-making network element, send a user entry rollback instruction to the first user plane network element, wherein the user entry rollback instruction comprises an instruction for the first user plane network element to delete the user entry, wherein the user entry comprises user information of the terminal device, and the first user plane network element forwards the data packet of the terminal device based on the user entry.

9. The network device according to claim 8, wherein the steering decision-making network element comprises any one or more of a steering function (SF) network element, a user steering function (USF) network element, and a software-defined networking (SDN) control network element; and determining that the fault occurs on the steering decision-making network element comprises at least one of the following:

after sending a fault detection request to the USF network element, failing to receive, by the control plane network element, within first reference duration, a detection result message returned by the USF network element, or after sending a fault detection request to the USF network element, receiving, by the control plane network element, a detection result message returned by the USF network element, wherein the detection result message indicates that the fault occurs on the USF network element, the SF network element, or the SDN control network element.

10. The network device according to claim 9, wherein when the fault occurs on the SDN control network element or the SF network element, the USF network element is configured to control the SF network element to bind the terminal device to a previously used user plane network element used by the terminal device for sending data packets, wherein binding the terminal device to the previously used user plane network element enables the terminal device to continue to send the data packet through the previously used user plane network element.

11. The network device according to claim 8, wherein the steering decision-making network element comprises any one or more of a steering function (SF) network element, a user steering function (USF) network element, and a software-defined networking (SDN) control network element; and determining that the fault occurs on the steering decision-making network element comprises at least one of the following:

after sending a fault detection request to the SDN control network element, failing to receive, by the control plane network element, within second reference duration, a detection result message returned by the SDN control network element, or after sending a fault detection request to the SDN control network element, receiving, by the control plane network element, detection result message returned by the SDN control network element, wherein the detection result message indicates that a fault occurs on the SF network element or the SDN control network element.

12. The network device according to claim 8, wherein the steering decision-making network element comprises any one or more of a steering function (SF) network element, a user steering function (USF) network element, and a software-defined networking (SDN) control network element; and
　determining that the fault occurs on the steering decision-making network element comprises at least one of the following:
　after successfully sending the user entry to the first user plane network element based on the identifier of the first user plane network element, and after successfully sending an entry configuration success message to the USF, failing to receive, by the control plane network element, within third reference duration, any message returned by the USF network element, or
　after sending the entry configuration success message to the USF, receiving, by the control plane network element, a migration failure message sent by the USF network element, wherein the migration failure message indicates that the fault occurs on the USF network element, the SDN control network element, or the SF network element.

13. The network device according to claim 8, wherein the one or more processors are further configured to execute the instructions to cause the network device to:
　receive a user service level agreement (SLA) change message, wherein the user SLA change message indicates that the user information of the terminal device is updated; and
　forward the user SLA change message to the steering decision-making network element, wherein, based on the user SLA change message, the steering decision-making network element configures the first user plane network element for the terminal device based on the updated user information, and sends the first migration configuration instruction to the control plane network element.

14. The network device according to claim 13, wherein the one or more processors are further configured to execute the instructions to cause the network device to:
　remain in a current state when the control plane network element determines that the fault occurs on the steering decision-making network element.

15. The network device according to claim 14, wherein the steering decision-making network element comprises any one or more of a steering function (SF) network element, a user steering function (USF) network element, and a software-defined networking (SDN) control network element; and
　determining that the fault occurs on the steering decision-making network element comprises at least one of the following:
　after sending a fault detection request to the USF network element, failing to receive, by the control plane network element, within a fourth reference duration, a detection result message returned by the USF network element, or
　after sending a fault detection request to the USF network element, receiving, by the control plane network element, a detection result message returned by the USF network element, wherein the detection result message indicates that the fault occurs on the USF network element, the SF network element, or the SDN control network element.

16. The network device according to claim 14, wherein the steering decision-making network element comprises any one or more of a steering function (SF) network element, a user steering function (USF) network element, and a software-defined networking (SDN) control network element; and
　determining that the fault occurs on the steering decision-making network element comprises at least one of the following:
　after sending a fault detection request to the SDN control network element, failing to receive, by the control plane network element, within fifth reference duration, a detection result message returned by the SDN control network element,
　after sending a fault detection request to the SDN control network element, receiving, by the control plane network element, a detection result message returned by the SDN control network element, wherein the detection result message indicates that the fault occurs on the SF network element or the SDN control network element,
　after forwarding the user SLA change message to the USF network element, failing to receive, by the control plane network element, within a sixth reference duration, any message returned by the USF network element, or
　after forwarding the user SLA change message to the USF network element, receiving, by the control plane network element, a detection result message sent by the USF network element, wherein the detection result message indicates that the fault occurs on the USF network element, the SDN control network element, or the SF network element.

17. The network device according to claim 8, wherein the one or more processors are further configured to execute the instructions to cause the network device to:
　when the control plane network element determines that the fault of the steering decision-making network element is eliminated, forward a user SLA change message to the steering decision-making network element, wherein:
　　the user SLA change message indicates that the user information of the terminal device is updated, and
　　the steering decision-making network element, based on receiving the user SLA change message, configures a second user plane network element for the terminal device based on updated user information, and sends, to the control plane network element, a second migration configuration instruction that carries an identifier of the second user plane network element.

18. The network device according to claim 13, wherein the steering decision-making network element comprises any one or more of a steering function (SF) network element, a user steering function (USF) network element, and a software-defined networking (SDN) control network element, and
　determining that the fault occurs on the steering decision-making network element comprises at least one of the following:
　determining, by the USF network element, that the fault occurs on the USF network element,
　after sending a fault detection request to the SDN control network element, failing to receive, by the USF network element, within first reference duration, a detection result message returned by the SDN control network element, or after sending a fault detection request to the SDN control network element, receiving, by the USF network element, a detection result message returned by the SDN control network element, wherein the detection result message indicates that the fault occurs on the SF network element or the SDN control network element.

19. The network device according to claim 13, wherein the one or more processors are further configured to execute the instructions to cause the network device to:
when detecting a selection operation for a migration control displayed on a display interface of the steering decision-making network element, determine that the traffic of the terminal device is to be steered to the first user plane network element, wherein the terminal device and the first user plane network element are specified by a user by using the migration control; or
when detecting that the first user plane network element is newly added to the plurality of user plane network elements of the network, determine that the traffic of the terminal device is to be steered to the first user plane network element.

20. A network device, comprising:
one or more memories configured to store instructions; and
one or more processors coupled to the one or more memories, wherein:
the network device is applied to a steering decision-making network element in a network,
the network further comprises a broadband network gateway (BNG) and a terminal device,
the BNG comprises a control plane network element and a plurality of user plane network elements,
the steering decision making network element is configured to steer traffic of the terminal device to one of the plurality of user plane network elements, and
the one or more processors are configured to execute the instructions to cause the network device to:
generate a migration configuration instruction when determining that the traffic of the terminal device needs to be steered to a first user plane network element, wherein the migration configuration instruction comprises an identifier of the first user plane network element, an identifier of the terminal device, and an instruction to forward a data packet of the terminal device through the first user plane network element;
when the steering decision-making network element determines that a fault occurs on the steering decision-making network element, skip sending the migration configuration instruction to the control plane network element; and
resend the migration configuration instruction to the control plane network element when determining that the fault of the steering decision-making network element is eliminated.

* * * * *

UNITED STATES PATENT AND TRADEMARK OFFICE
CERTIFICATE OF CORRECTION

PATENT NO. : 12,501,289 B2  
APPLICATION NO. : 18/344014  
DATED : December 16, 2025  
INVENTOR(S) : Peng et al.

Page 1 of 1

It is certified that error appears in the above-identified patent and that said Letters Patent is hereby corrected as shown below:

In the Claims

In Column 44, in Claim 11, Line 66, delete "detection" and insert -- a detection --.

In Column 45, in Claim 11, Line 1, delete "a fault" and insert -- the fault --.

Signed and Sealed this  
Third Day of February, 2026

John A. Squires  
*Director of the United States Patent and Trademark Office*